United States Patent
Hamada et al.

(10) Patent No.: US 7,454,910 B2
(45) Date of Patent: Nov. 25, 2008

(54) WASTE HEAT RECOVERY SYSTEM OF HEAT SOURCE, WITH RANKINE CYCLE

(75) Inventors: Shinichi Hamada, Anjo (JP); Minoru Sasaki, Anjo (JP); Atsushi Inaba, Kariya (JP)

(73) Assignee: Denso Corporation, Kariya (JP)

( * ) Notice: Subject to any disclaimer, the term of this patent is extended or adjusted under 35 U.S.C. 154(b) by 694 days.

(21) Appl. No.: 11/053,125

(22) Filed: Feb. 8, 2005

(65) Prior Publication Data
US 2005/0144949 A1    Jul. 7, 2005

Related U.S. Application Data

(63) Continuation-in-part of application No. 10/873,971, filed on Jun. 21, 2004, now abandoned.

(30) Foreign Application Priority Data

Jun. 23, 2003  (JP)  ............................. 2003-178599
Dec. 2, 2003   (JP)  ............................. 2003-403492

(51) Int. Cl.
*F01K 23/10*   (2006.01)
(52) U.S. Cl. ............................. 60/618; 60/660; 60/670
(58) Field of Classification Search ........... 60/614–618, 60/660, 670
See application file for complete search history.

(56) References Cited

U.S. PATENT DOCUMENTS

| | | | |
|---|---|---|---|
| 3,888,084 A | 6/1975 | Hawkins | |
| 4,901,531 A * | 2/1990 | Kubo et al. | 60/618 |
| 4,996,845 A | 3/1991 | Kim | |
| 5,000,003 A * | 3/1991 | Wicks | 60/618 |
| 5,327,987 A | 7/1994 | Abdelmalek | |

(Continued)

FOREIGN PATENT DOCUMENTS

JP    63-96449    4/1988

(Continued)

OTHER PUBLICATIONS

Examination Report dated Jan. 22, 2008 in Japanese Application No. 2003-403492 with English translation thereof.

(Continued)

*Primary Examiner*—Hoang M Nguyen
(74) *Attorney, Agent, or Firm*—Harness, Dickey & Pierce, PLC

(57) ABSTRACT

A waste heat recovery system of an engine has a cooling water circuit and a Rankine cycle. Cooling water is circulated between the engine and a radiator in the cooling water circuit. The Rankine cycle has a heater and an expansion device. The heater performs heat exchange between the cooling water heated by the engine and an operation fluid so as to heat the operation fluid in the Rankine cycle. The expansion device expands the heated operation fluid, so as to generate driving power. The heater is arranged in a bypass circuit so as to be in parallel with the radiator with respect to the cooling water flow. Thus, waste heat of the cooling water heated by the engine can be effectively recovered without reducing a cooling capacity of the radiator.

28 Claims, 8 Drawing Sheets

U.S. PATENT DOCUMENTS 5,351,487 A * 10/1994 Abdelmalek .................. 60/618
2003/0005696 A1 * 1/2003 Wilson ........................ 60/618

FOREIGN PATENT DOCUMENTS

| JP | 2-104956 | 4/1990 |
| JP | 4-187857 | 7/1992 |
| JP | 4-191453 | 7/1992 |
| JP | 04-224228 | 8/1992 |
| JP | 5-248707 | 9/1993 |
| JP | 07-027435 | 1/1995 |
| JP | 2540738 | 7/1996 |
| WO | WO 01/65101 | 9/2001 |

OTHER PUBLICATIONS

Examination Report dated Oct. 23, 2007 issued in corresponding EP Application No. 04 014 585.6.

* cited by examiner

WASTE HEAT RECOVERY SYSTEM OF HEAT SOURCE, WITH RANKINE CYCLE

CROSS REFERENCE TO RELATED APPLICATION

This application is a CIP application of U.S. application Ser. No. 10/873,971, filed on Jun. 21, 2004. The present application is related to Japanese Patent Applications No. 2003-178599 filed on Jun. 23, 2003 and No. 2003-403492 filed on Dec. 2, 2003, the disclosure of which is incorporated herein by reference.

FIELD OF THE INVENTION

The present invention is related to a waste heat recovery system used for a heat generating element (heat source), such as a motor and a heat engine. More particularly, the present invention is suitable for a power recovery using waste heat of an internal combustion engine of a vehicle for example.

BACKGROUND OF THE INVENTION

According to JP-B2-2540738, a Rankine cycle is constructed using components of a refrigerant cycle in a vehicle internal combustion engine or the like. The Rankine cycle is constructed as a generally known waste heat recovery system of a heat generating element such as an internal combustion engine. Waste heat of the heat generating element is recovered, so that the recovered power assists a shaft output of the engine.

FIG. 15 shows a cooling water circuit 20' according to a related art. Cooling water is circulated between an engine 10 and a radiator 21 in the cooling water circuit 20'. A high-temperature evaporator 210 is connected with the cooling water circuit 20', so as to form a Rankine cycle for recovering waste heat generated in the engine 10.

The cooling water circuit 20' includes a switching valve 26 using a thermostat, in general. In this structure, when temperature of cooling water is low, such as in a case where the engine 10 is started, cooling water bypasses the radiator 21 so as not to be introduced into the radiator 21.

In general, a mechanical-type hot water pump 22 is used for circulating cooling water in the cooling water circuit 20'. However, in the related art, an appropriate location of the high-temperature evaporator 210 is not considered in the cooling water circuit 20'. Because the high-temperature evaporator 210 is serially connected with the radiator 21, a flow resistance of water may become large. When the flow resistance becomes large, flow amount of the cooling water decreases. As a result, a cooling performance in the radiator 21 decreases.

The capacity of the hot water pump 22 is in proportion with respect to the rotation speed (revolution) of the engine 10. Accordingly, a flow amount of water circulated by the hot water pump 22 is limited in a low revolution range of the engine 10. Besides, a response of temperature sensitivity of the thermostat used in the switching valve 26 is slow. Therefore, fluctuation of cooling water temperature or fluctuation of cooling water flow amount becomes large depending on a vehicle running condition in a cooling water circuit, which uses the mechanical hot water pump 22 or the switching valve 26 employing the thermostat. Accordingly, a heat amount supplied to the high-temperature evaporator 210 (i.e., Rankine cycle) may become unstable. In addition, when a heat consumption in the Rankine cycle becomes excessively large, the flow amount of cooling water flowing through the cooling water circuit 20' excessively decreases, and an engine operation (e.g., fuel vaporization in the engine 10) is not effectively performed. Accordingly, the output power of the engine 10 may be reduced, and fuel efficiency may become low.

Further, a compressor is used in the refrigerant cycle, and is also used as an expansion device in the Rankine cycle. Therefore, when the refrigerant cycle is operated in summer or the like, the compressor cannot be used as the expansion device in the Rankine cycle. In this case, a power recovery operation cannot be performed in the Rankine cycle. Accordingly, waste heat of the engine 10 cannot be recovered for assisting the shaft output of the engine 10 or the like.

SUMMARY OF THE INVENTION

In view of the foregoing problems, it is an object of the present invention to effectively use waste heat of the thermal medium heated by a heat source (heat generating element, e.g., engine) without reducing a cooling performance of the heat source, which is cooled by circulation of the thermal medium. It is another object of the present invention to produce a waste heat recovery system of the heat source, in which a heat amount can be stably secured on the side of the Rankine cycle without reducing the cooling performance of the heat source.

According to the present invention, a waste heat recovery system of a heat source (heat generating element) cooled by a circulation of a thermal medium, includes a cooling heat exchanger for cooling the thermal medium, and a Rankine cycle. The cooling heat exchanger is disposed in a thermal medium circulating circuit through which the thermal medium is circulated between the cooling heat exchanger and the heat source. Further, the Rankine cycle includes a heater that performs heat exchange between an operation fluid and the thermal medium heated by the heat source so as to heat the operation fluid, and an expansion device that expands the operation fluid heated by the heater to be evaporated so as to generate a driving power. In the waste heat recovery system, the heater is arranged in parallel with the cooling heat exchanger in such a manner that the thermal medium flowing through the heater bypasses the cooling heat exchanger.

Because the heater is arranged in parallel with the cooling heat exchanger with respect to the flow of thermal medium, a flow resistance of the thermal medium flowing through the cooling heat exchanger is not increased due to the arrangement of the heater of the Rankine cycle. Thus, waste heat energy of the thermal medium can be effectively used without affecting the cooling performance of the heat source such as the engine. For example, the thermal medium is cooling water.

Preferably, a bypass circuit is branched from a section of the thermal medium circulating circuit where thermal medium is circulated between the heat source and the cooling heat exchanger to bypass the cooling heat exchanger, and merged with a downstream side of the cooling heat exchanger in the thermal medium circulating circuit. In this case, the heater is arranged in the bypass circuit. Alternatively, a heater circuit is provided, and the heater is arranged in the heater circuit. Further, the heater circuit includes a heating heat exchanger which performs heat exchange between blown air and thermal medium heated by the heat source so as to heat the blown air.

Preferably, a pumping unit is disposed in the thermal medium circulating circuit to circulate the thermal medium, and a switching unit is disposed in the thermal medium circulating circuit to adjust a flow distribution between a flow amount of thermal medium to be introduced into the heater and a flow amount of thermal medium passing through the cooling heat exchanger. Further, at least one of a discharge capacity of the pumping unit and the flow distribution distributed by the switching unit is variable.

Further, a control unit controls at least one of the pumping unit and the switching unit based on temperature of thermal medium discharged from the heat source in the thermal medium circulating circuit. In this case, the control unit calculates a difference (deviation) between a target thermal medium temperature and an actual temperature of the thermal medium discharged from the heat source.

For example, when the difference is less than a first threshold, the control unit determines that a temperature of the heat source is excessively low, and controls the switching unit so as to decrease a distribution amount of thermal medium flowing into the cooling heat exchanger when the distribution amount is not substantially zero. In contrast, when the difference is greater than a second threshold that is higher than the first threshold, the control unit determines that the temperature of the heat source is excessively high, and controls the pumping unit so as to increase the discharge capacity when the pumping unit has an extra discharge capacity.

Alternatively, when the difference is less than a first threshold, the control unit determines that a temperature of the heat source is excessively low, and controls the pumping unit so as to decrease the discharge capacity of the pumping unit. In contrast, when the difference is greater than a second threshold that is larger than the first threshold, the control unit determines that the temperature of the heat source is excessively high, and controls the pumping unit so as to increase the discharge capacity.

Further, when the difference is less than a first threshold, the control unit determines that a temperature of the heat source is excessively low, and controls the switching unit so as to decrease a distribution amount of thermal medium distributed by the switching unit to the cooling heat exchanger. In contrast, when the difference is greater than a second threshold, that is higher than the first threshold, the control unit determines the temperature of the heat source is excessively high, and controls the switching unit so as to increase the distribution amount.

The waste heat recovery system further includes a second switching unit for opening and closing a flow passage of thermal medium flowing into the heater, and the second switching unit is located on one of an inlet side of the heater and an outlet side of the heater. For example, the second switching unit is provided to change a flow amount of the thermal medium flowing into the heater. Alternatively, a forcibly closing control means forcibly controls the second switching unit when the temperature of the thermal medium is equal to or greater than a predetermined temperature.

In the present invention, the expansion device can be mechanically coupled with a compressor of a refrigerant cycle. In this case, the expansion device is disposed to add the driving power generated in the expansion device to the compressor, when the driving power is generated in the expansion device.

The waste heat recovery system further includes a first pumping unit and a second pumping unit. The first pumping unit is disposed in the thermal medium circulating circuit to circulate the thermal medium. The second pumping unit is disposed in the thermal medium circulating circuit to circulate the thermal medium into the heater in an auxiliary manner. The second pumping unit has a variable discharge capacity. The heat source is a rotating device. The first pumping unit is controlled based on a rotation speed of the rotating device.

The waste heat recovery system further includes a switching unit. The switching unit is disposed in the thermal medium circulating circuit to adjust a flow distribution between a flow amount of thermal medium to be introduced into the heater and a flow amount of thermal medium passing through the cooling heat exchanger. At least one of a discharge capacity of the second pumping unit and the flow distribution distributed by the switching unit is variable.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

In the preferred embodiments, a waste heat recovery system of a heat generating element (heat source) in the present invention is typically used for an engine of a vehicle such as an automobile.

First Embodiment

Figure 1:
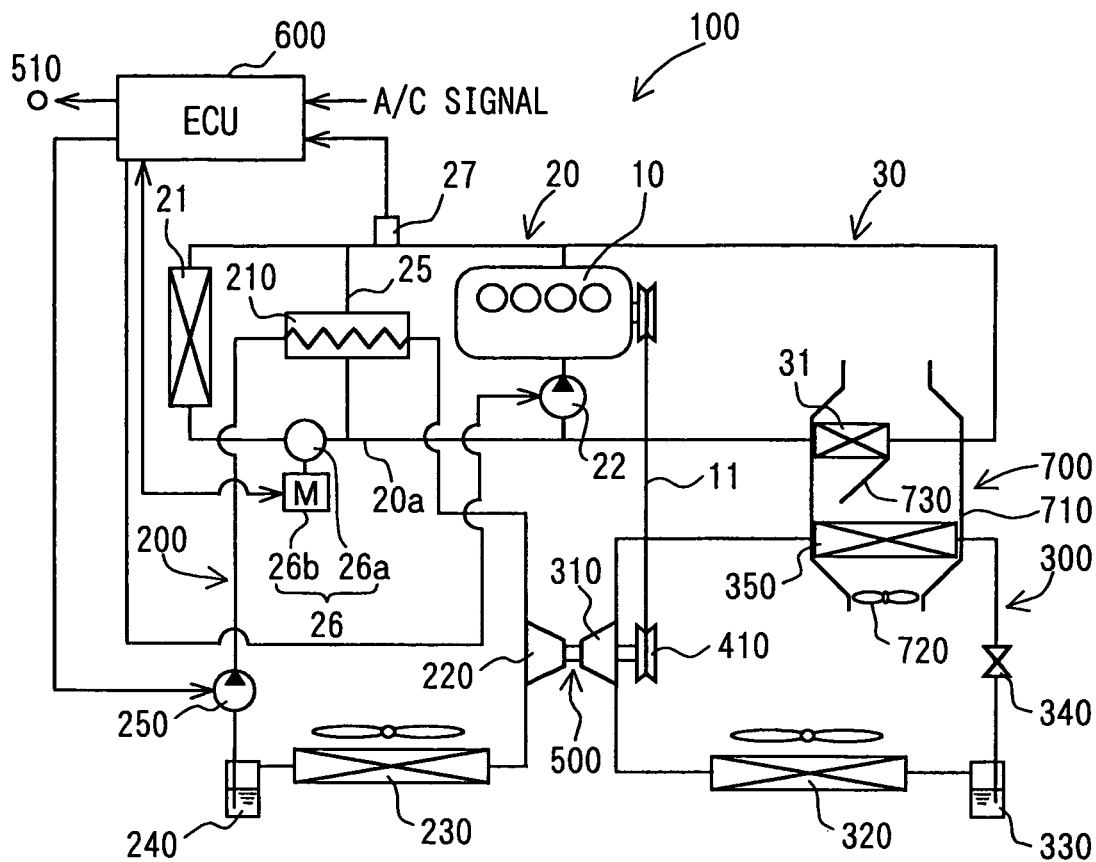
FIG. 1 is a schematic diagram showing an entire structure of a waste heat recovery system for an engine, according to a first embodiment in the present invention.

The first embodiment of the present invention will be now described with reference to FIGS. 1-4. As shown in FIG. 1, a waste heat recovery system 100 for recovering waste heat of an internal combustion engine 10 is constructed with a Rankine cycle 200 and a refrigerant cycle 300.

The internal combustion engine 10 is a water-cooled engine cooled by circulation of cooling water. The engine 10 includes a circulation path (not shown) inside a cylinder block or the like. The circulation path is located around a combustion chamber (not shown) of the engine 10. Cooling water flows through the circulation path so as to perform a heat transmitting of heat energy from the engine 10 to the cooling water. The heat energy is a part of energy generated by combustion performed in the combustion chamber of the engine 10. The cooling water is heated in the engine 10, circulated in the circulation path of the engine 10, and then cooled in a cooling water circuit 20 including a radiator 21. Here, a heater circuit 30 can be provided for heating air using the heated engine-cooling water (hot water) as a heat source.

The Rankine cycle 200 is constructed with a heater 210, an expansion device 220, a condenser 230, a liquid receiver 240 and a pump 250. Operation fluid is included in the Rankine cycle 200, so that a closed circuit is formed. The operation fluid is circulated in the order of the heater 210→the expansion device 220→the condenser 230→the liquid receiver 240→the pump 250. The operation fluid is circulated in the Rankine cycle 200 by an operation of the electrically driven pump 250. The heater 210 is a heat exchanger for performing heat exchange between operation fluid supplied from the pump 250 and high-temperature cooling water passing through the cooling water circuit 20, so as to heat the operation fluid. In detail, the operation fluid supplied from the pump 250 is introduced into an operation fluid passage (not shown) of the heater 210. The high-temperature cooling water passing through the cooling water circuit 20 is introduced into a cooling water passage (not shown) of the heater 210. A partition wall (not shown) is provided between the cooling water passage and the operation fluid passage in the heater 210, for partitioning the cooling water passage and the operation fluid passage from each other. The expansion device 220 is a fluid device for generating a driving power such as a rotation power by expansion of super-heat vapor operation fluid heated in the heater 210. The condenser 230 is a heat exchanger for performing heat exchange between the operation fluid discharged from the expansion device 220 and exterior air, so as to condense operation fluid. The liquid receiver 240 is a receiver for separating operation fluid condensed in the condenser 230 into two phases (i.e., gas and liquid phases). Liquid fluid separated in the condenser 230 flows to the pump 250.

A radiator 21 is provided in the cooling water circuit 20. The radiator 21 performs heat exchange between cooling water circulated by the hot water pump 22 and exterior air so as to cool the cooling water. The hot water pump 22 is provided on the side of the engine 10. The hot water pump 22 can be either a mechanical pump or an electrically driven pump. A capacity of the mechanical pump is in proportion to a rotation speed (revolution) of the engine 10. The hot water pump 22 constructs a pumping unit which circulates cooling water in the cooling water circuit 20. As the hot water pump 22, the electrically driven pump is used in the following embodiment.

A bypass circuit 25, through which cooling water bypasses the radiator 21, is provided in the cooling water circuit 20. The bypass circuit 25 is branched from a water passage section between the engine 10 and the radiator 21, and is joined to a water passage section on the downstream of the radiator 21. The heater 210 is provided in the bypass circuit 25 to construct the Rankine cycle 200. The heater 210 performs heat exchange between cooling water flowing through the bypass circuit 25 and the operation fluid, so as to heat the operation fluid by the cooling water flowing through the bypass circuit 25 as a heat source.

Thus, a flow of cooling water passing through the radiator 21 and a flow of cooling water passing through the heater 210 become in parallel. The flow of cooling water passing through the heater 210 performs heat exchange with operation fluid flowing through the heater 210. Therefore, a flow resistance is not increased in the cooling water circuit 20 including the radiator 21, due to addition of the heater 210.

As a result, waste heat energy can be used without affecting a cooling performance of the engine 10, compared with a structure in which the heater 210 and the radiator 21 are serially arranged with respect to the cooling water flow.

The cooling water circuit 20 is not limited to the parallel structure constructed with the bypass circuit 25 shown in FIG. 1. The parallel structure can be constructed with a branch circuit that is formed in the cooling water circuit 20, such that a cooling water flow branches from the cooling water circuit 20, passes through the branch circuit, and merges with the cooling water circuit 20.

Alternatively, the parallel structure can be constructed with an externally connected circuit communicated with the cooling water circuit 20, for example. In this case, the cooling water flow branches from the cooling water circuit 20 and merges with the cooling water circuit 20 through the externally connected circuit. Other branch and merge structure, in which the heater 210 and the radiator 21 are arranged in parallel with respect to the cooling water flow, can be also used.

A switching valve 26 is preferably provided in a junction located between a cooling water circuit section 20a located on the downstream side of the radiator 21 and the bypass circuit 25. Alternatively, the switching valve 26 is also preferably provided in a section between the radiator 21 and the junction located between the cooling water circuit section 20a and the bypass circuit 25. Here, the section between the radiator 21 and the junction is located in the cooling water circuit section 20a. Thus, a flow amount of cooling water flowing through the cooling circuit 20 can be divided into a flow amount of cooling water flowing through the bypass circuit 25 and a flow amount of cooling water flowing through the radiator 21, in accordance with cooling water temperature. As a result, a waste heat recovery can be performed in the Rankine cycle 200 using the heater 210, while the engine 10 is maintained at a predetermined temperature. Cooling water (thermal medium) is circulated through the engine 10, so that the engine 10 is cooled. The body temperature of the engine 10 is represented by temperature of cooling water flowing out of the engine 10 (outlet water temperature).

The switching valve 26 is not limited to a switching valve using a thermostat, and can be an electrically driven switching valve. Here, the thermostat controls the flow amount of cooling water bypassing the radiator 21 in accordance with temperature of cooling water flowing around the thermostat. The thermostat controls the cooling water flow amount using a thermal characteristic of an inside wax which expands and contracts by heat.

The switching valve 26 can control a distribution between a flow amount of cooling water flowing through the bypass circuit 25 and a flow amount of cooling water flowing through the radiator 21. The flow amount of cooling water flowing through the bypass circuit 25 is a flow amount of cooling water which performs heat exchange in the heater 210. The flow amount of cooling water flowing into the radiator 21 is referred to as a radiator flow amount distribution, which is controlled by the switching valve 26. In contrast, the flow amount of cooling water flowing into the heater 210 for performing heat exchange is referred to as a heater flow amount distribution. As the switching valve 26, an electrically driven switching valve is used in the following embodiment.

The electrically driven switching valve 26 is constructed with a switching valve section 26a and an electrically control section 26b. The switching valve section 26a variably controls a flow amount of cooling water passing therethrough. The control section 26b is electrically connected with a control unit 600 to drive the valve section 26a.

Figure 2A:
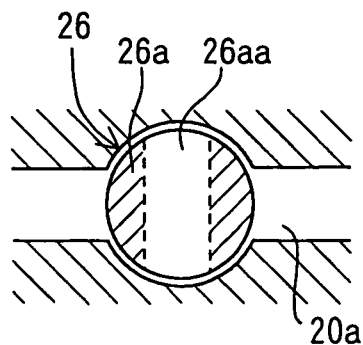
FIG. 2A is a schematic cross-sectional view of a switching unit shown in FIG. 1, showing a switching condition in which a cooling water flow amount distributed to a radiator is zero.
Figure 2B:
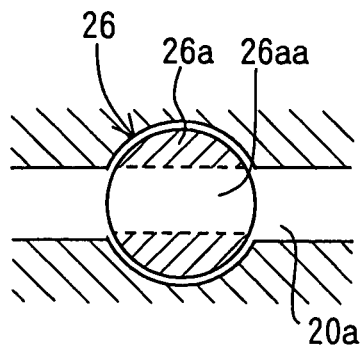
FIG. 2B is a schematic cross-sectional view of the switching unit showing a switching condition in which the cooling water flow amount distributed to the radiator is maximum.

As shown in FIGS. 2A and 2B, the valve section 26a is provided in the cooling water circuit section 20a, so as to open and close the flow passage of the cooling water circuit section 20a. The switching valve 26 is a rotary type switching valve. A cooling water passage 26aa is formed in the valve section 26a to penetrate the valve section 26a. The valve section 26a is rotatable. The cooling water passage 26aa is opened and closed by the control section 26b of the switching valve 26 in accordance with a rotation position of the valve section 26a. As shown in FIG. 2A, the cooling water passage 26aa is switched to be closed when the cooling water passage 26aa is rotated to be substantially perpendicular to the cooling water flow of the cooling water circuit section 20a. In this situation, the radiator flow amount distribution becomes zero. On the contrary, as shown in FIG. 2B, the cooling water passage 26aa is switched to be fully opened when the cooling water passage 26aa is rotated to be substantially in parallel with the cooling water flow of the cooling water circuit section 20a. In this situation, the radiator flow amount distribution becomes maximum.

Referring back to FIG. 1, a heater core 31 is provided in the heater circuit 30 in which cooling water (hot water) is circulated by the hot water pump 22. The heater core 31 is located in an air conditioning case 710 of an air conditioning unit 700, so as to perform heat exchange between air brown by a fan 720 and the hot water, so that the air brown by the fan 720 is heated. An air mixing door 730 is provided at the heater core 31. The air mixing door 730 is opened and closed, so as to variably control an amount of air blown through the heater core 31. The heater circuit 30 is connected with the cooling water circuit 20, so as to construct an externally connected circuit. The cooling water (hot water) flow is branched from the cooling water circuit 20 to the externally connected circuit, and is merged with the cooling water circuit 20 from the externally connected circuit (i.e., heater circuit 30).

A refrigerant cycle 300 is constructed with a compressor 310, a condenser 320, a liquid receiver 330, an expansion valve 340 and an evaporator 350. Refrigerant is filled in the refrigerant cycle 300 so as to form a closed circuit. Therefore, refrigerant flows in the refrigerant cycle 300 in this order, the compressor 310→the condenser 320 →the liquid receiver 330→the expansion valve 340→the evaporator 350. The compressor 310 is a fluid device for compressing refrigerant flowing through the refrigerant cycle 300 to be high-temperature and high-pressure refrigerant. Here, the compressor 310 is a fixed displacement type compressor. A discharge amount of refrigerant is a predetermined amount by one rotation of the fixed displacement type compressor. The compressor 310 can be a variable displacement type compressor. In this case, a discharge amount of refrigerant discharged from the compressor 310 can be variably controlled by the control unit 600. When the variable displacement type compressor is used for the compressor 310, power needed for driving the compressor 310 can be decreased in an operation condition in which a load of the refrigerant cycle 300 becomes relatively small in autumn or in spring, for example. The condenser 320 is a heat exchanger connected with a discharge side of the compressor 310 for performing heat exchange with exterior air so as to cool and condense refrigerant. The liquid receiver 330 separates refrigerant condensed in the condenser 320 to be two-phase refrigerant (i.e., gas refrigerant and liquid refrigerant). Liquid refrigerant separated in the liquid receiver 330 is drawn out of the liquid receiver 330 from a section connected to the expansion valve 340. The expansion valve 340 decompresses and expands the liquid refrigerant introduced from the liquid receiver 330. A thermo-expansion valve is used as the expansion valve 340 in the first embodiment. Refrigerant is isenthalpically decompressed in the thermo-expansion valve. The thermo-expansion valve controls its throttle opening, so that a super-heat degree of refrigerant drawn into the compressor 310 becomes a predetermined degree. The evaporator 350 is provided in the air conditioning case 710 of the air conditioning unit 700. Further, the heater core 31 is disposed in the air conditioning case 710 downstream of the evaporator 350 with respect to the air flow direction. The evaporator 350 is a heat exchanger for cooling air to be blown into the passenger compartment by the fan 720. The refrigerant, which is decompressed and expanded in the expansion valve 340, is evaporated in the evaporator 350 by absorbing heat from air, so that air blown by the fan 720 is cooled while passing through the evaporator 350. A refrigerant outlet side of the evaporator 350 is connected with a suction side of the compressor 310. A mixture rate between air cooled in the evaporator 350 and air heated by the heater core 31 is controlled in accordance with an opening degree of the air mixing door 730 so that conditioned air is obtained. Temperature of the conditioned air is controlled at a predetermined temperature set by a passenger riding on the vehicle.

Figure 3:
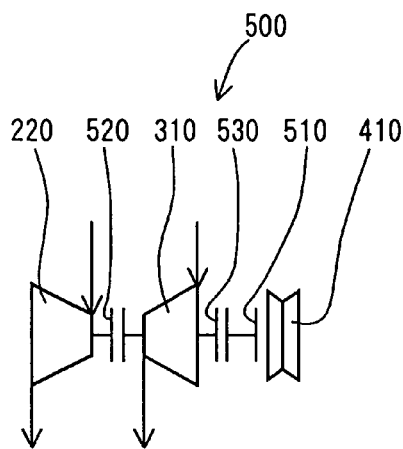
FIG. 3 is a schematic diagram showing a driving device connecting an expansion device in a Rankine cycle in FIG. 1 and a compressor in a refrigerant cycle in FIG. 1.

Next, a transmission device 500 is described in accordance with FIG. 3. The transmission device 500 connects the expansion device 220 constructing the Rankine cycle 200 and the compressor 310 constructing the refrigerant cycle 300. The transmission device 500 has a one-way clutch 520, a pulley 410, a one-way clutch 530 and a solenoid clutch 510. The one-way clutch 520 can connect or disconnect the expansion device 220 and the compressor 310. The pulley 410 transmits rotating power between the engine 10 and the transmission device 500. The one-way clutch 530 can connect the pulley 410 and the compressor 310. The transmission clutches 520, 530, 510, and the pulley 410 construct the transmission device 500 which can transmit driving power of the engine 10.

When the expansion device 220 is operated, engaging mechanisms (not shown) in the one-way clutch 520 are engaged each other so as to be connected with the compressor 310. On the contrary, when the expansion device 220 is not operated, the engaging mechanisms are disengaged, so that the expansion device 220 does not assist the rotation of the compressor 310 or the like. As a result, rotating power generated in the expansion device 220 is used for rotating power of the compressor 310, so that the expansion device 220 can assist refrigerant compression performed by the compressor 310. When driving power is not generated in the expansion device 220, that is, when the Rankine cycle 300 is not operated, the compressor 310 is not rotated by the expansion device 220. In this case, even when the refrigerant cycle 300 is operated, the expansion device 220 does not rotate the compressor 310, while the rotation of the compressor 310 for compressing refrigerant is permitted.

The pulley 410 is a rotating member receiving driving power of the engine 10 via a belt 11. When the operation of the refrigerant cycle 300 is stopped, the solenoid clutch 510 is disconnected. In this situation, rotation of the pulley 410 is permitted only in the direction in which rotation power of the engine 10 is transmitted. That is, the pulley 410 can be driven by the engine 10 while mechanically disconnected with the connected devices (i.e., the one-way clutch 530 and the compressor 310). Accordingly, transmission of rotating power from the pulley 410 to the connected devices is terminated. When the solenoid clutch 510 is connected, rotating power can be transmitted between the pulley 410 and the connected devices.

Engaging mechanisms (not shown) provided in the one-way clutch 530 are connected each other when rotating power of the pulley 410 can be transmitted, so that rotation of the pulley 410 and rotation of the compressor 310 can be assisted each other. Therefore, when rotating power generated by the expansion device 220 becomes equal to or greater than rotating power needed for rotating the compressor 310, surplus rotating power from the expansion device 220 is added to the engine 10 via the clutches 520, 530, 510 and the pulley 410. Thus, the expansion device 220 can assist rotation power of the engine 10.

The control unit 600 is connected with a cooling water temperature detecting unit 27, the hot water pump 22 and the electrically control section 26b of the switching valve 26. The cooling water temperature detecting unit 27 (water temperature sensor) detects temperature of cooling water flowing through the cooling water circuit 20. A cooling water detection signal, an A/C signal (air conditioning signal), a flow amount distributing signal and the like are input to the control unit 600. The cooling water detection signal indicates cooling water temperature detected by the water temperature sensor 27. The A/C signal is an operating request signal for requesting operation of the refrigerant cycle 300 and an operation of the heater circuit 30, in order to mix cooled air and heated air at a predetermined mixing rate. The flow amount distributing signal is an opening degree signal of the valve section 26a, and is used as a flow distributing signal of the switching valve 26. The control unit 600 controls the hot water pump 22 and the switching valve 26 in accordance with the cooling water detection signal and the flow amount distributing signal.

The control unit 600 estimates a discharge capacity of the hot water pump 22 based on a driving signal output to a motor section (not shown) of the hot water pump 22. When a structure of the motor is an electrically driven type, a voltage signal is used for a driving signal of the motor. When the structure of the motor is a brushless type, an electric current signal is used for a driving signal of the motor.

The control unit 600 controls the pump 250 and the solenoid clutch 510 or the like. A read only memory (ROM), a random access memory (RAM), a microprocessor (CPU), an input port 35 and an output port 36 of a microcomputer are connected via an interactive bus each other, so that the control unit 600 is constructed.

In the first embodiment, preferably, an outlet temperature of the engine 10 is detected by the water temperature sensor 27 so as to be used as cooling water temperature in the cooling water circuit 20. The location of the water temperature sensor 27 is not limited to the section between the radiator 21 and the engine 10. The location of the water temperature sensor 27 can be set at an outlet port section of a circulation passage inside the engine 10, or a section in the vicinity of the outlet port section of the circulation passage. The location of the water temperature sensor 27 can be at any section, as long as the temperature sensor 27 can detect temperature of cooling water flowing into the upstream side of the radiator 21. Thus, the control unit 600 can control the hot water pump 22 and the switching valve 26, based on temperature (outlet water temperature) of cooling water flowing out of the engine 10, not based on temperature of cooling water flowing through the radiator 21. As a result, the control unit 600 can control the hot water pump 22 and the switching valve 26, while prioritizing the cooling performance of the engine 10.

The control unit 600 can precisely increase and decrease a discharge capacity (i.e., discharge amount) of the hot water pump 22 by controlling at least the hot water pump 22, in accordance with an outlet water temperature Tw (i.e., driving condition) of the engine 10, regardless of rotation speed of the engine 10. Besides, the control unit 600 can precisely increase and decrease the radiator distribution flow amount by controlling at least the switching valve 26 in accordance with the outlet water temperature Tw of the engine 10.

Figure 4:
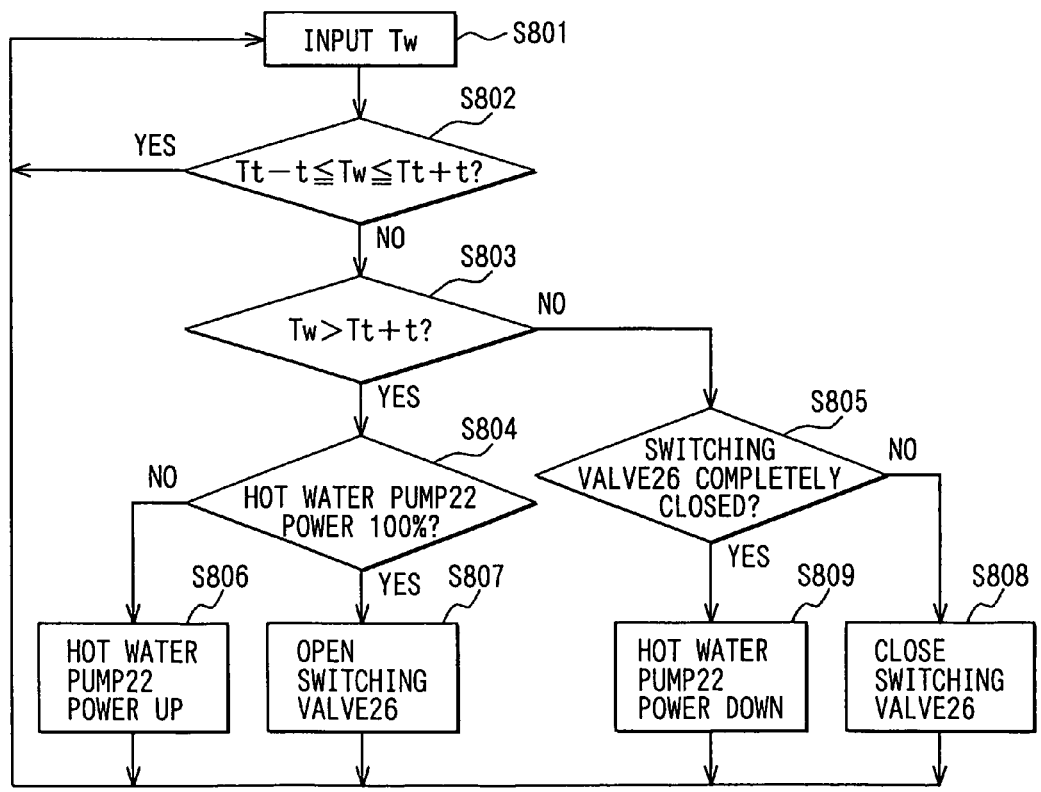
FIG. 4 is a flow diagram showing a control routine which controls an electrically driven pumping unit in FIG. 1 and an electrically driven switching unit in FIG. 1.

Next, the control operation (first control operation) for controlling the flow amount of cooling water flowing through the cooling water circuit 20 is described in accordance with FIG. 4.

At step S801, the control unit 600 inputs a cooling water temperature detection signal transmitted from the water temperature sensor 27, so as to store the outlet water temperature Tw of the engine 10.

At step S802, it is determined whether the outlet water temperature Tw stored at step S801 is within a predetermined range $[(Tt-t)-(Tt+t)]$ including a target cooling water temperature Tt. Here, a first threshold is shown by $-t$, and a second threshold is shown by $+t$. Accordingly, $(Tt+t)$ shows the maximum value of the target cooling water temperature Tt, and $(Tt-t)$ shows the minimum value of the target cooling water temperature Tt. That is, at step S802, it is determined whether a relationship of $(Tt-t \leq Tw \leq Tt+t)$ is satisfied. The predetermined range $[(Tt-t)-(Tt+t)]$ is a control range of the outlet water temperature Tw controlled by the control unit 600. The control range $[(Tt-t)-(Tt+t)]$ is set in a range between 60° C. and 110° C., for example.

A difference $(Tw-Tt)$ between the outlet water temperature Tw and the target cooling water temperature Tt is calculated. When this difference $(Tw-Tt)$ is in a predetermined range $(-t-+t)$, that is, the difference $(Tw-Tt)$ is equal to or greater than the first threshold $-t$, and is equal to or less than the second threshold $+t$ $(-t \leq Tw-Tt \leq t)$, the control returns to step S801. In this case, temperature of cooling water flowing through the cooling water circuit 20 is already controlled within the predetermined target cooling water temperature range $[(Tt-t)-(Tt+t)]$. Further, the hot water pump 22 and the switching valve 26 need not to be operated. Therefore, the heater distribution flow amount does not change. Heat can be stably secured to be supplied to the heater 210 (i.e., Rankine cycle 200), via cooing water flowing through the bypass circuit 25.

By contrast, when the relationship $(Tt-t \leq Tw \leq Tt+t)$ is not satisfied, the control routine proceeds to step S803. That is, when the difference $(Tw-Tt)$ is not within a predetermined range (i.e., $-t-+t$), namely, when the difference $(Tw-Tt)$ is less than the first threshold $-t$, or is greater than the second threshold $+t$, the control routine proceeds to step S803.

At step S803, it is determined whether the difference $(Tw-Tt)$ calculated at step S802 is greater than the second threshold $+t$. That is, it is determined whether the outlet water temperature Tw is greater than the maximum value $(Tt+t)$ of the target cooling water temperature. Namely, it is determined whether a relationship $(Tw>Tt+t)$ is satisfied or not. When the difference $(Tw-Tt)$ is greater than the second threshold $+t$, the outlet water temperature Tw is greater than the maximum value $(Tt+t)$ of the target cooling water temperature. Accordingly, the outlet water temperature Tw is determined to be excessively greater than the target cooling water temperature Tt, and the control routine proceeds to step S804. On the contrary, when the difference $(Tw-Tt)$ is equal to or less than the second threshold $+t$, the outlet water temperature Tw is determined to be less than the minimum value (Tt−t) of the target cooling water temperature, based on the determinations performed at step S802 and step S803, and the control routine proceeds to step S805. In this case, a relationship (Tw<Tt−t) is satisfied. Accordingly, the outlet water temperature Tw is determined to be excessively smaller than the target cooling water temperature Tt.

At step S804, it is determined whether the hot water pump 22 has an extra discharge capacity, that is, it is predetermined whether the discharge capacity (power) of the hot water pump 22 is 100% or not, based on the driving signal transmitted from the control unit 600 to the hot water pump 22. When the hot water pump 22 has an extra discharge capacity, the control routine proceeds to step S806. Otherwise, when the hot water pump 22 does not have an extra discharge capacity, the control routine proceeds to step S807.

At step S806, the hot water pump 22 is controlled so as to increase the discharge amount of the hot water pump 22, because it is determined that the hot water pump 22 has an extra discharge capacity, at step S804. Subsequently, the control routine returns to step S801.

At step S807, the switching valve 26 is controlled to be opened so as to increase the radiator flow amount distribution, because it is determined that the hot water pump 22 does not have an extra discharge capacity, at step S804. Subsequently, the control routine returns to step S801.

At step S805, it is determined whether the switching valve 26 is completely closed (i.e., the radiator flow amount distribution is zero), based on the opening degree signal (flow distributing signal) transmitted from the switching valve 26. When the radiator flow amount distribution is not zero, that is, the switching valve 26 is not completely closed, it is determined that the outlet water temperature Tw can be increased by decreasing the flow amount of cooling water flowing through the radiator 21. Subsequently, the control routine proceeds to step S808. Otherwise, when the radiator flow amount distribution is zero, that is, the switching valve 26 is completely closed, it is determined that the outlet water temperature Tw cannot be increased by controlling the radiator flow amount distribution, and the control routine proceeds to step S809.

At step S808, the switching valve 26 is controlled to be closed so as to decrease the radiator flow amount distribution, because it is determined that the control (decreasing) of the radiator flow amount distribution is possible to increase the outlet water temperature Tw at step S805. Subsequently, the control routine returns to step S801.

At step S809, the hot water pump 22 is controlled, so as to decrease the discharge amount of the hot water pump 22, because it is determined that the control of the radiator flow amount distribution is not possible to increase the outlet water temperature Tw at step S805. Subsequently, the control routine returns to step S801.

According to the first embodiment described above, the heater 210 constructing the Rankine cycle 200 is arranged to be in parallel with the radiator 21 with respect to the flow of the cooling water. Therefore, the heater 210 does not affect the cooling performance of the engine 10. The heater 210 arranged in parallel with the radiator 21 with respect to the flow of the cooling water is not limited to be located in the bypass circuit 25. The heater 210 can be arranged in other parallel-structured circuits. For example, the heater 210 can be arranged in a branch circuit formed inside the cooling water circuit 20. In this case, the flow of the cooling water is branched from the cooling water circuit 20 and is merged with the cooling water circuit 20, after flowing through the branch circuit. The heater 210 can be also arranged in an externally connected circuit connected with the cooling water circuit 20 from an outside. In this case, the flow of the cooling water is branched from the cooling water circuit 20, and is merged with the cooling water circuit 20, after flowing through the externally connected circuit.

The first control operation performed by the control unit 600 has a control priority order as follows. The top priority is securing the outlet water temperature Tw of the engine. The second priority is securing the flow amount of cooling water flowing through the bypass circuit 25 for performing heat exchange with the operation fluid flowing through the heater 210. Thus, the cooling water circuit 20 can obtain an amount of heat consumed in the heater 210 (i.e., Rankine cycle 200) using cooling water flowing through the bypass circuit 25 as a heat source, without affecting the performance (operation) of the engine. Besides, the control unit 600 can control the outlet water temperature Tw, so as to control temperature of a main body of the engine 10 which is represented by the outlet water temperature Tw.

The first control operation can preferably control the hot water pump 22 and the switching valve 26 as described below, when a difference between the target cooling water temperature Tt and the actual outlet water temperature Tw is relatively large. Specifically, when the difference (Tw−Tt) is less than the first threshold −t, it is determined that the actual outlet water temperature Tw is excessively lower compared with the target cooling water temperature Tt (i.e., a negative determination is made at step S803 in FIG. 4). In this case, the control unit 600 controls the switching valve 26 so as to decrease the radiator flow amount distribution, as long as the radiator flow amount distribution is not zero. As a result, the outlet water temperature Tw can be increased up to the target cooling water temperature Tt, without decreasing the heater flow amount distribution.

By contrast, when the difference (Tw−Tt) is greater than the second threshold +t, it is determined that the actual outlet water temperature Tw is excessively higher compared with the target cooling water temperature Tt (i.e., a positive determination is made at step S803 in FIG. 4). In this case, the control unit 600 controls the hot water pump 22 so as to increase the discharge flow amount of the hot water pump 22, as long as the hot water pump 22 has an extra capacity in its discharge capacity. As a result, the heater flow amount distribution of cooling water is increased, so that the outlet water temperature Tw can be decreased to the target cooling water temperature Tt.

Thus, a waste heat amount recovered by the heater 210 can be sufficiently secured. Simultaneously, the cooling performance of the engine 10 is controlled, so that the actual outlet water temperature Tw is controlled within an allowable temperature range [i.e., predetermined target cooling water temperature range [(Tt−t)-(Tt+t)]] of the target cooling water temperature.

Second Embodiment

The second embodiment of the present invention will be now described with reference to FIGS. 5 and 6.

A switching valve 126, which has a generally known thermostat, is used in the second embodiment, instead of the electrically driven switching valve 26 described in the first embodiment.

Figure 5:
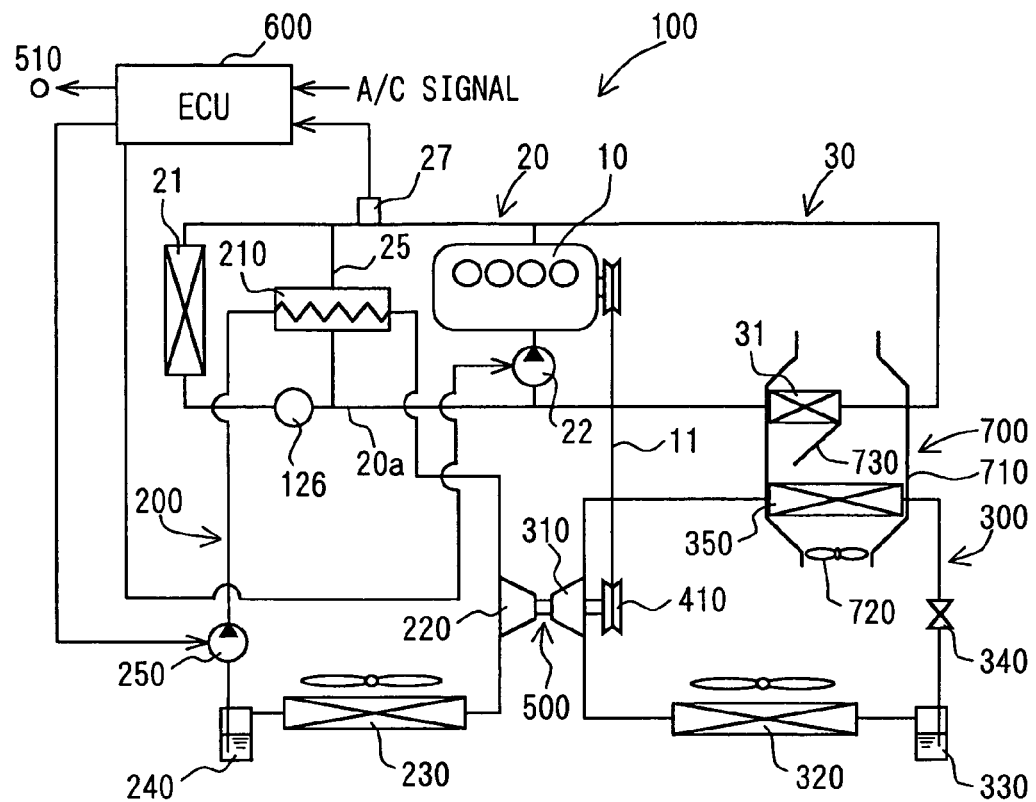
FIG. 5 is a schematic diagram showing an entire structure of a waste heat recovery system for an engine according to a second embodiment in the present invention.

As shown in FIG. 5, the control unit 600 controls the hot water pump 22, but does not control the switching valve 126, in accordance with the outlet water temperature Tw of the engine 10. The thermostat responds to the temperature of cooling water flowing through the cooling water circuit section 20a, so that the radiator distribution flow amount is controlled by the switching valve 126 from zero to the maximum flow amount.

The hot water pump 22 is an electrically driven pump. Therefore, a discharge amount (discharge capacity) of the electrically driven hot water pump 22 is not limited due to a rotation speed of the engine 10, compared with a mechanical type pump. The discharge amount of the mechanical type pump is in proportion with respect to a rotation speed (revolution) of the engine 10 which is affected by a vehicle running condition.

Figure 6:
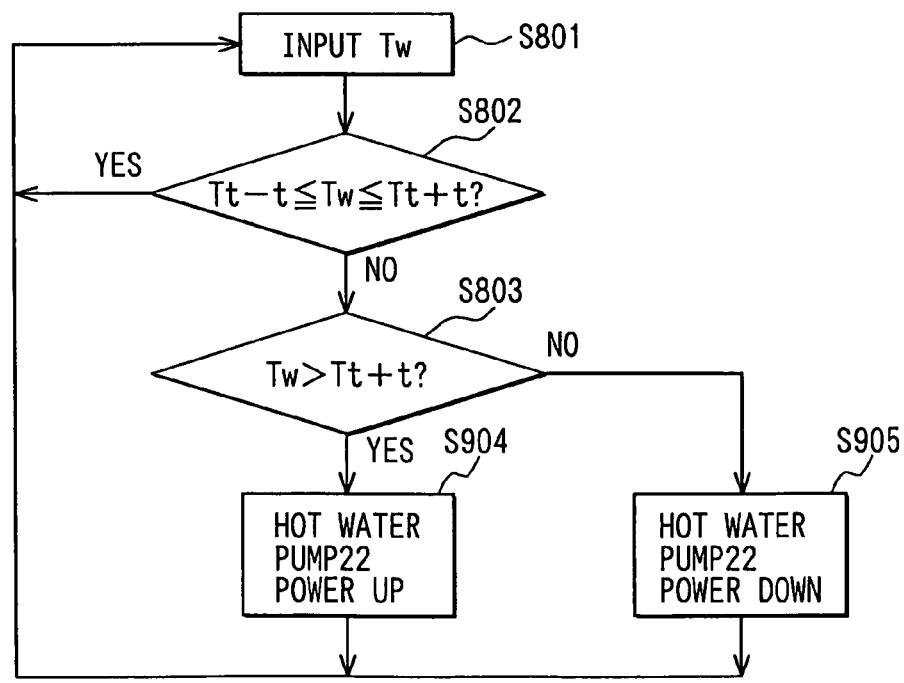
FIG. 6 is a flow diagram showing a control routine which controls an electrically driven pumping unit in FIG. 5.

Next, the control operation (second control operation) for controlling the flow amount of cooling water flowing through the cooling water circuit 20 is described in accordance with FIG. 6.

The second control operation includes a control process composed of step S801 to step S803 and a control process composed of step S904 and step S905. The control process composed of step S801 to step S803 is equivalent to that of the first embodiment.

At step S801, the control unit 600 inputs the cooling water temperature detection signal transmitted from the water temperature sensor 27, so as to store the actual outlet water temperature Tw. At step S802, it is determined whether the actual outlet water temperature Tw is within the allowable temperature range (Tt−t-Tt+t). That is, it is determined whether the relationship (Tt−t≦Tw≦Tt+t) is satisfied. When the outlet water temperature Tw is within the allowable temperature range [(Tt−t)-(Tt+t)], the control routine returns to step S801, without controlling the hot water pump 22 by the control unit 600. Otherwise, when the outlet water temperature Tw is out of the allowable temperature range [(Tt−t)-(Tt+t)], the control routine proceeds to step S803.

At step S803, it is determined whether the difference (Tw−Tt) is greater than the second threshold +t. When the difference is greater than the second threshold +t, the control routine proceeds to step S904. When the difference is less than the second threshold +t, i.e., it is determined that the difference is less than the first threshold −t, and the control routine proceeds to step S905.

Specifically, at step S904, the hot water pump 22 is controlled, so as to increase the discharge amount of the hot water pump 22. Subsequently, the control routine returns to step S801. In contrast, at step S905, the hot water pump 22 is controlled, so as to decrease the discharge amount of the hot water pump 22. Subsequently, the control routine returns to step S801.

According to the second embodiment described above, the outlet water temperature Tw of the engine 10 can be controlled within the allowable temperature range [(Tt−t)-(Tt+t)] of the target cooling water temperature. That is, the difference (Tw−Tt) can be controlled within the predetermined range (−t-+t), while the heater flow amount distribution is prioritized compared with the radiator flow amount distribution. That is, the control unit 600 controls the hot water pump 22 so as not to decrease the heater distribution flow amount, and not to increase the radiator distribution flow amount, as much as possible. Therefore, a waste heat amount radiated from the radiator 21 can be reduced as much as possible, so that an amount of waste heat recovered by the Rankine cycle 200 can be effectively increased.

According to the second embodiment described above, the control unit 600 controls the hot water pump 22, so that the outlet water temperature Tw of the engine 10 can be relatively easily controlled at a substantially constant temperature.

Third Embodiment

The third embodiment of the present invention will be now described with reference to FIGS. 7 and 8.

Figure 7:
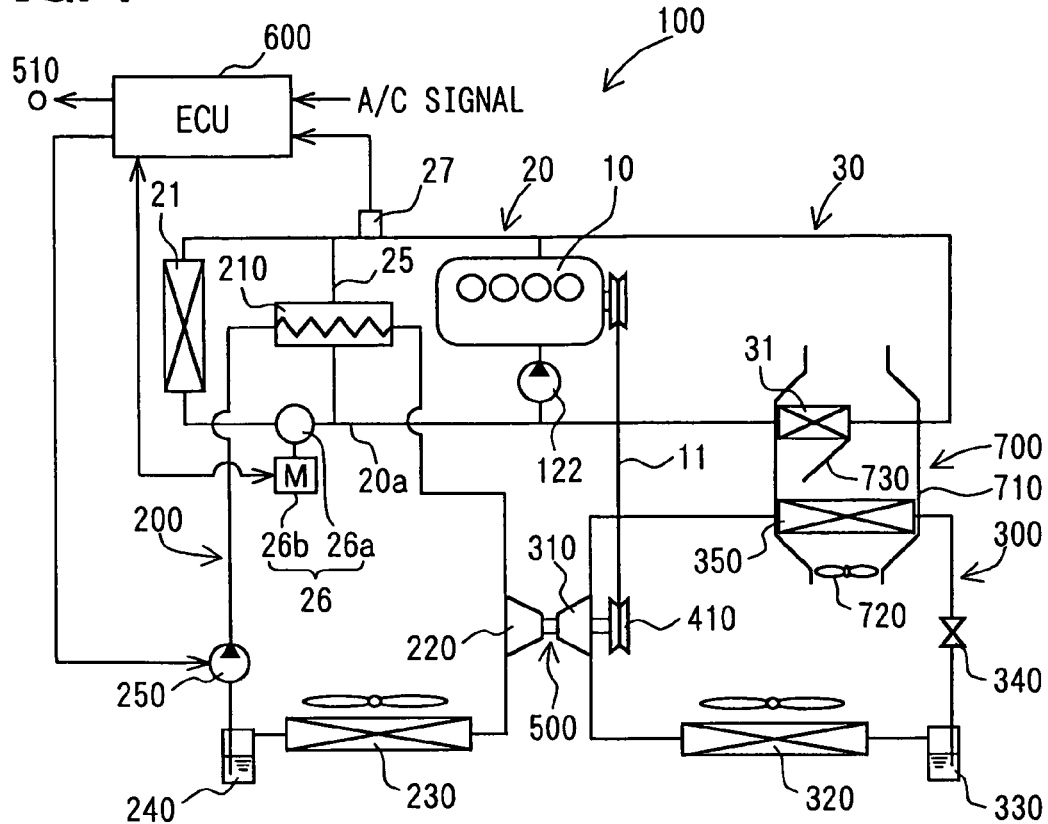
FIG. 7 is a schematic diagram showing an entire structure of a waste heat recovery system for an engine according to a third embodiment in the present invention.

As shown in FIG. 7, a hot water pump 122, which has a generally known mechanical structure, is used in the third embodiment, instead of the electrically driven hot water pump 22 described in the first embodiment. Further, the control unit 600 controls the switching valve 26, but does not control the hot water pump 122.

The switching valve 26 is an electrically driven switching valve. Therefore, the control unit 600 can control the switching valve 26 without delaying, compared with a conventional switching valve using a thermostat which has a relatively slow response control characteristic. The radiator distribution flow amount is controlled at a predetermined flow amount in accordance with the outlet water temperature Tw detected by the water temperature sensor 27, for example.

Figure 8:
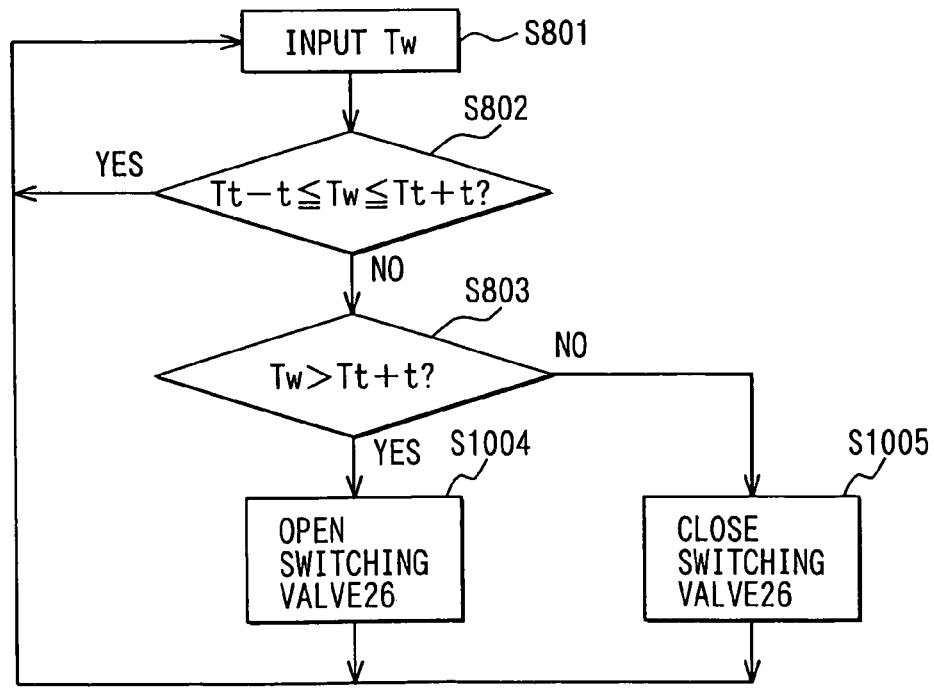
FIG. 8 is a flow diagram showing a control routine which controls an electrically driven switching unit in FIG. 7.

Next, the control operation (third control operation) for controlling the flow amount of cooling water flowing through the cooling water circuit 20 is described in accordance with FIG. 8.

The third control operation includes the control process composed of step S801 to step S803 and a control process composed of step S1004 and step S1005. The control process composed of step S801 to step S803 is equivalent to that of the first embodiment.

At step S801, the control unit 600 inputs the cooling water temperature detection signal transmitted from the water temperature sensor 27, so as to store the actual outlet water temperature Tw. At step S802, it is determined whether the actual outlet water temperature Tw is within the allowable temperature range [(Tt−t)-(Tt+t)]. When the outlet water temperature Tw is within the allowable temperature range [(Tt−t)-(Tt+t)], that is, when the relationship (Tt−t≦Tw≦Tt+t) is satisfied, the control routine returns to step S801, without controlling the hot water pump 22 by the control unit 600. Otherwise, when the outlet water temperature Tw is out of the allowable temperature range [(Tt−t)-(Tt+t)], that is, when the relationship (Tt−t≦Tw≦Tt+t) is not satisfied, the control routine proceeds to step S803.

At step S803, it is determined whether the difference (Tw−Tt) is greater than the second threshold +t. When the difference is greater than the second threshold +t, the control routine proceeds to step S1004. When the difference is less than the second threshold +t, it is determined that the difference (Tw−Tt) is less than the first threshold −t, and the control routine proceeds to step S1005.

Specifically, at step S1004, the switching valve 26 is controlled to be opened, so as to increase the radiator distribution flow amount. Subsequently, the control routine returns to step S801. At step S1005, the switching valve 26 is controlled to be closed, so as to decrease the radiator distribution flow amount. Subsequently, the control routine returns to step S801.

According to the fourth embodiment described above, the control unit 600 controls the switching valve 26 in accordance with the actual outlet water temperature Tw. Therefore, the outlet water temperature Tw can be stably controlled at the target water temperature Tt.

Fourth Embodiment

Figure 9:
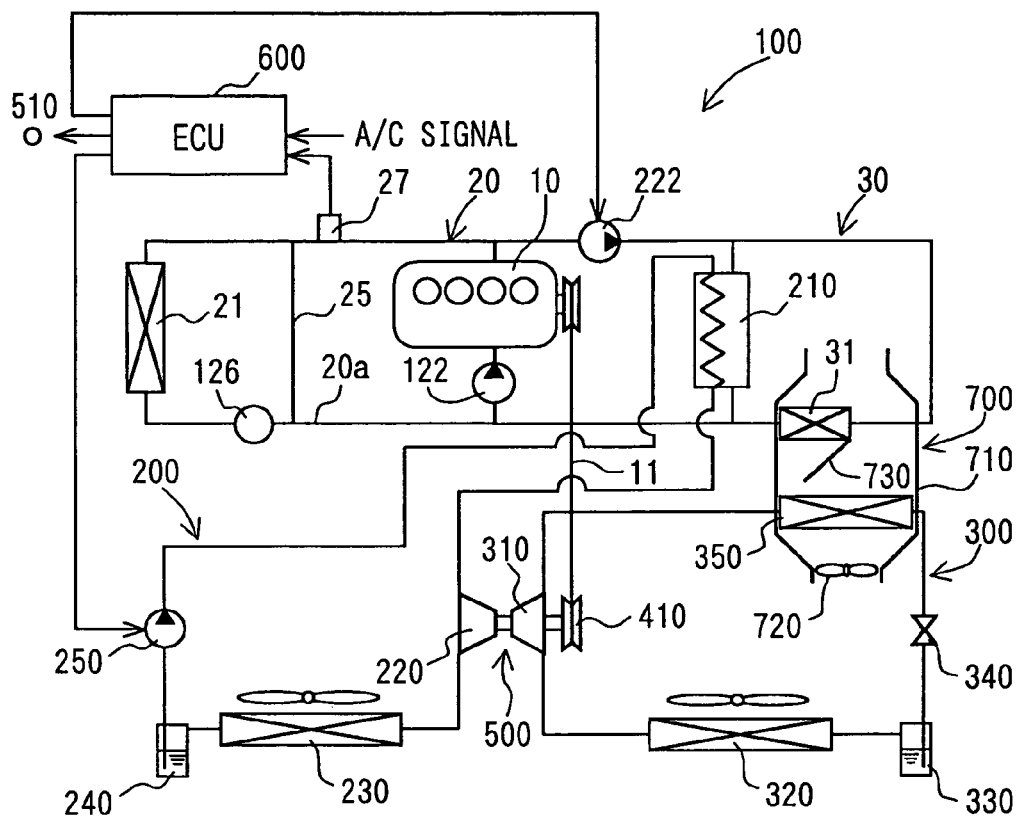
FIG. 9 is a schematic diagram showing an entire structure of a waste heat recovery system for an engine according to a fourth embodiment in the present invention.

The fourth embodiment of the present invention will be now described with reference to FIGS. 9 and 10. As shown in FIG. 9, the heater 210 is arranged in the heater circuit 30 in the fourth embodiment.

The heater circuit 30 is connected to the cooling water circuit 20. The flow of the cooling water (hot water) is branched from the cooling water circuit 20, and is merged with the cooling water circuit 20, so as to construct the externally connected circuit. Even in this case, the heater 210 is arranged in parallel with the radiator 21 with respect to the flow of the cooling water.

In the fourth embodiment, the heater 210 is preferably arranged in parallel with the heater core 31 with respect to the flow of the cooling water. The heater core 31 is used as a heating heat exchanger for performing heat exchange between cooling water and air to be blown into the passenger compartment, to heat the air. Accordingly, a flow resistance of the heater circuit 30 including the heater core 31 is not increased, and a heating performance of a heating system is not affected by the heater 210.

Furthermore, the heater 210 arranged in the heater circuit 30 can be serially connected to the heart core 31 with respect to the flow of cooling water. The heater 210 can be arranged on the upstream side of the heater core 31 or the downstream side of the heater core 31, as needed. Even in this case, the heater 210 is arranged in parallel with the radiator 21 with respect to the flow of the cooling water.

Accordingly, a flow resistance of the cooling water circuit 20 including the radiator 21 is not increased, and a cooling performance of the engine 10 is not affected by the heater 210. The outlet water temperature Tw of the engine 10 is controlled at an appropriate temperature by the control unit 600. Therefore, heat energy of cooling water can be effectively used as waste heat energy by heat exchange performed by the heater 210, without affecting the performance of the engine 10, as same as the first embodiment.

Furthermore, in the fourth embodiment, the hot water pump 22 and the switching valve 26 described in the first embodiment are respectively replaced from the electrically driven type devices into the mechanical type devices 122, 126. Further, the hot water pump 122 is used as a first hot water pump, and the electrically driven pump 222 is provided as a second hot water pump. Accordingly, even in a case where a discharge amount of the mechanically driven hot water pump 122 is small because the revolution of the engine 10 is low, the second hot water pump 222 can secondarily increase the flow amount of cooling water flowing into the heater 210. When the rotation speed (revolution) of the engine 10 is low, the flow amount of cooling water flowing through the cooling water circuit 20 is relatively small. Even in this case, the second hot water pump 222 individually provided in the heater circuit 30 is secondarily operated, so that the flow amount of the cooling water flowing into the heater 210 can be increased. Therefore, a waste heat amount supplied to the Rankine cycle 200 can be stabilized.

Figure 10:
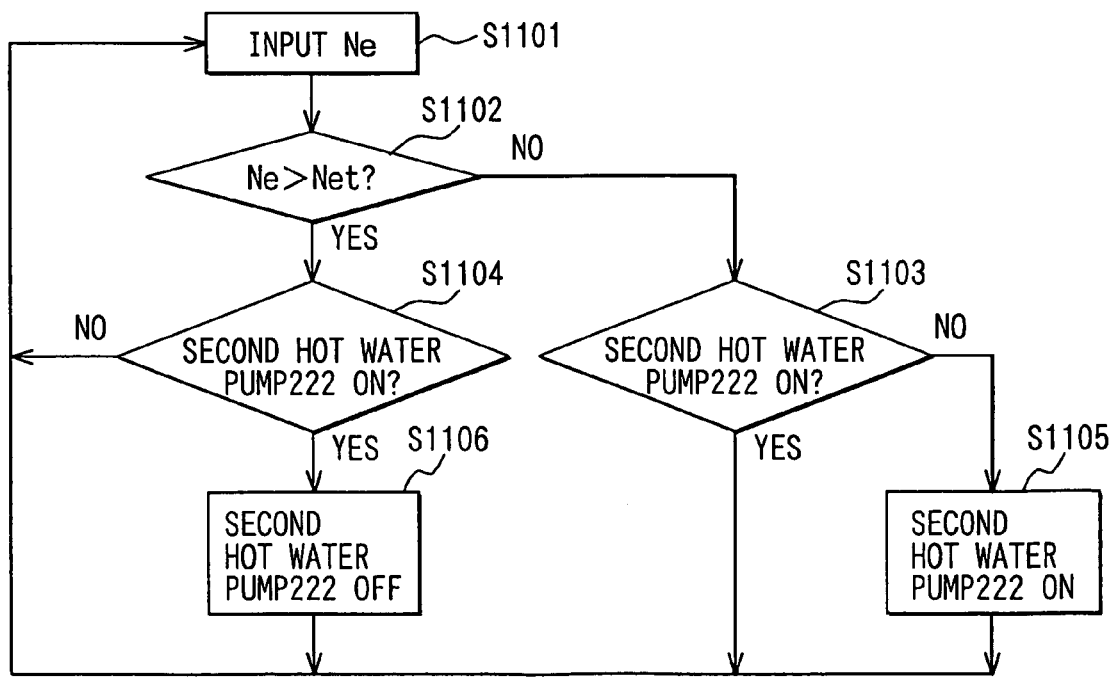
FIG. 10 is a flow diagram showing a control routine which controls an electrically driven second pumping unit in FIG. 9.

Next, the control operation (fourth control operation) for controlling the flow amount of cooling water (hot water) flowing through the heater circuit 30 including the heater 210 is described in accordance with FIG. 10.

At step S1101, the control unit 600 inputs the rotation speed signal transmitted from the rotation sensor, so as to store rotation speed Ne (e.g., 900 rpm) of the engine 10.

At step S1102, it is determined whether the rotation speed Ne input in step S1101 is greater than a target speed Net (third threshold) of the engine rotation speed. When the rotation speed Ne is equal to or less than the third threshold Net, the control routine proceeds to step S1103. By contrast, when the rotation speed Ne is greater than the third threshold Net, the control routine proceeds to step S1104. The third threshold Net is the minimum value of the rotation speed Ne used for estimating the discharge amount of the hot water pump 122 by the control unit 600. When the rotation speed Ne is equal to or less than the third threshold Net, the discharge amount of the hot water pump 122 is equal to or less than a predetermined amount, for example.

When the rotation speed Ne is determined to be equal to or less than the third threshold Net at step S1102, the control routine proceeds to step S1103. At step S1103, it is determined whether the second hot water pump 222 is operating (turned ON). When the second hot water pump 222 is turned ON, the control routine returns to step S1101. That is, the second hot water pump 222 is kept to be turned ON. Otherwise, when the second water pump 222 is not turned ON (i.e., turned OFF), the control routine proceeds to step S1105.

When the rotation speed Ne is determined to be equal to or less than the third threshold at step S1102, and the second hot water pump 222 is determined to be turned OFF at step S1103, the second hot water pump 222 is turned ON at step S1105. Then the control routine returns to step S1101.

When the rotation speed Ne is determined to be greater than the third threshold Net at step S1102, it is determined whether the second hot water pump 222 is turned ON at step S1104. When the second hot water pump 222 is turned OFF, the control routine returns to step S1101. That is, the second hot water pump 222 is kept to be turned OFF. Otherwise, when the second hot water pump 222 is turned ON, the control routine proceeds to step S1106.

When the rotation speed Ne is determined to be greater than the third threshold at step S1102, and the second hot water pump 222 is determined to be turned ON at step S1104, the second hot water pump 222 is turned OFF at step S1106. Then the control routine returns to step S1101.

According to the fourth embodiment, the fourth control operation performed by the control unit 600 inputs the rotation speed Ne of the engine 10. When the rotation speed Ne is equal to or less than the target rotation speed Net, the fourth control operation estimates the discharge amount of the hot water pump 122 to be small, and turns the second hot water pump 222 ON. The hot water 122 circulates cooling water in the cooling water circuit 20 and the heater circuit 30. Thus, when the second hot water pump 222 is turned ON, the flow amount of cooling water, which flows into the heater 210 arranged in the heater circuit 30, can be increased. Because, the control unit 600 secondarily starts the second hot water pump 222 individually provided in the heater circuit 30, so that the flow amount of cooling water, which flows into the heater 210, can be increased. Therefore, waste heat amount supplied to the Rankine cycle 200 can be stabilized, even in a case where the flow amount of cooling water flowing through the cooling water circuit 20 is relatively small because the rotation speed Ne of the engine 10 is low.

In the fourth embodiment described above, the control unit 600 estimates the discharge amount of the hot water pump 122 based on the rotation speed Ne of the engine 10. However, the calculation basis of the discharge amount of the hot water pump 122 is not limited to the rotation speed Ne of the engine 10. The discharge amount of the hot water pump 122 can be calculated based on a rotation speed of a heat engine or a rotation speed of a rotating device, as long as the rotation speed of the rotating device is in proportion to the discharge amount of the hot water pump 122. The rotating device is a motor, an inverter, for example. When the hot water pomp 122 is driven by the heat engine or the rotating device as well as the engine 10, the discharge amount of the hot water pump 122 is limited by the rotation speed of the heat engine or the rotating device. When the control unit 600 determines the discharge amount of the hot water pump 122 to be small based on the rotation speed of the rotating device, the control unit 600 starts the second hot water pump 222 as a secondary device. Thus, the control unit 600 can stabilize the waste heat amount supplied to the Rankine cycle 200. Here, the rotating device is not only the engine 10, but also any one of the heat engine, the rotating device, and the like.

According to the first embodiment to the forth embodiment, the engine 10 and the engine waste heat recovery system 100 are operated based on the following operating modes.

1) First Operating Mode (Refrigerant Cycle Operating Mode While Rankine Cycle is Stopped)

This first operating mode is used when the Rankine cycle is stopped, and an A/C (air conditioning) request is input, that is, the A/C signal is transmitted to the control unit 600. For example, the Rankine cycle is stopped, when cooling water is not sufficiently heated (e.g., 80° C. in this embodiment). This situation is mainly in an operating condition immediately after starting the engine 10 or the like.

In this first operating mode, the hot water pump 22 (122) of the cooling water circuit 20 is operated, and the switching valve 26 (126) is closed, so that the radiator distribution flow amount becomes substantially zero, and cooling water flows through the bypass circuit 25. The pump 250 is stopped so that the Rankine cycle 200 is stopped. Furthermore, the solenoid clutch 510 is connected. Thus, driving power of the engine 10 is transmitted to the compressor 310 via the pulley 410 and the solenoid clutch 510, so that the compressor 310 is operated, and the refrigerant cycle 300 is operated.

The outlet water temperature Tw is equal to or less than the lower limit (Tt−t) of the target cooling water temperature in this first operating mode. The radiator distribution flow amount is controlled to be substantially zero, by either the electrically driven switching valve 26 controlled by the control unit 600 or the thermostat type switching valve 126 controlled by temperature sensing of the thermostat.

2) Second Operating Mode (Refrigerant Cycle Operating Mode with Rankine Cycle)

When the A/C request is input, and waste heat of the engine 10 can be sufficiently obtained, the Rankine cycle 200 is operated and driving power obtained from the Rankine cycle 200 is added to the compressor 310, so as to operate the refrigerant cycle, in this second operating mode.

The control unit 600 controls the pump 250 to be operated, so as to circulate the operation fluid through the Rankine cycle 200. Further, the solenoid clutch 510 is disconnected, so that driving power of the engine 10 is not transmitted to the compressor 310 via the pulley 410.

The operation fluid is pressurized by the pump 250, so as to be transferred to the heater 210 in the Rankine cycle 200. The operation fluid is heated by the high-temperature engine cooling water in the heater 210, so as to be super-heat vapor operation fluid, and introduced to the expansion device 220. The operation fluid is isentropically expanded and decompressed in the expansion device 220, and its heat energy and its pressure energy are partially transferred into rotation driving power. The decompressed operation fluid is condensed in the condenser 230, and separated into gas fluid and liquid fluid in the liquid receiver 240. The liquid fluid is drawn into the pump 250.

As a result, driving power obtained by the expansion device 220 is transmitted to the compressor 310, so that the compressor 310 can be rotated without rotating power of the engine 10. Therefore, fuel consumption of the engine 10 can be decreased.

3) Third Operating Mode (Combined Operating Mode of Rankine Cycle and Refrigerant Cycle)

This third operating mode is used when the A/C request is input, a cooling load is relatively high (e.g., in summer), and waste heat of the engine 10 is sufficiently obtained. In this third operating mode, driving power of the expansion device 220 and driving power of the engine 10 are combined to operate the compressor 310.

The control unit 600 controls the pump 250 to be operated, so as to circulate the operation fluid through the Rankine cycle 200. The solenoid clutch 510 is connected so that driving power of the engine 10 is transmitted to the compressor 310 via the pulley 410.

Driving power of the expansion device 220 and driving power of the engine 10 are added to the compressor 310, so as to increase a refrigerant discharge amount of the compressor 310, so that cooling performance can be enhanced.

4) Fourth Operating Mode (Refrigerant Cycle and Power Recovery Mode Due to Rankine Cycle Mode)

This fourth operating mode is used when the A/C request is input, a cooling load is relatively low (e.g., in spring or autumn), and driving power needed to drive the compressor 310 is relatively small. Therefore, surplus driving power obtained by the Rankine cycle 200 is added to the engine 10, in this operating mode.

The control unit 600 controls the pump 250 in the same manner as that of the 3) Third Operating Mode. In the fourth operating mode, the operation fluid is circulated through the Rankine cycle 200, so that the Rankine cycle 200 is operated. The solenoid clutch 510 is connected, so that driving power of the engine 10 is transmitted to the compressor 310 via the pulley 410.

Driving power is added from the expansion device 220 to the compressor 310 in accordance with a cooling load, so that the compressor 310 is driven. Surplus driving power of the expansion device 220 is supplied to the pulley 410, so as to reduce driving power of the engine 10. As a result, a power recovery operation can be performed for assisting a shaft output of the engine 10.

5) Fifth Operating Mode (Power Recovery Operating Mode)

A variable displacement type compressor 310 is used in this fifth operating mode. This operating mode is used when the refrigerant cycle and power recovery mode due to the Rankine cycle is selected and the A/C request is not input, for example. In this operating mode, driving power needed for the variable displacement type compressor 310 is set at substantially zero by the control unit 600, and the expansion device 220 assists the shaft output of the engine 10.

That is, the control unit 600 controls discharge amount of the compressor 310 to be substantially zero in the fifth operating mode.

Fifth Embodiment

The fifth embodiment of the present invention will be now described with reference to FIGS. 11 and 12.

In general, the heaters 210 described in the first embodiment to the fourth embodiment have the cooling water passage for introducing cooling water and the operation fluid passage for introducing the operation fluid. Therefore, when cooling water is introduced into the cooling water passage, the operation fluid flowing through the operation fluid passage may be heated by waste heat of cooling water. In this situation, heat exchange is performed between the cooling water and the operation fluid, even when the Rankine cycle 200 is not operated (Rankine cycle OFF). Waste heat energy of cooling water is not effectively used while the Rankine cycle is not operated. Heat energy of cooling water, which is used for heating operation fluid, is not effectively used, and becomes a heat loss. The heater 210 is arranged in parallel with the radiator 21 in the cooling water circuit 20. Furthermore, a heat capacity of cooling water flowing through the heater 210 is added to a heat capacity of the cooling water circuit 20, and the total heat capacity of the cooling water circuit 20 is increased. Accordingly, a warming-up performance of the engine 10 may be decreased, depending on an engine condition when the engine is started.

In the fifth embodiment, a waste heat recovery system is constructed so that waste heat of cooling water is used without affecting the cooling performance of the engine 10 and the warming-up performance of the engine 10. A switching valve 28 is used as a second switching unit 28 arranged at an upstream side of the heater 210 in the bypass circuit 25 with respect to the flow of cooling water, as described in the first embodiment.

Figure 11:
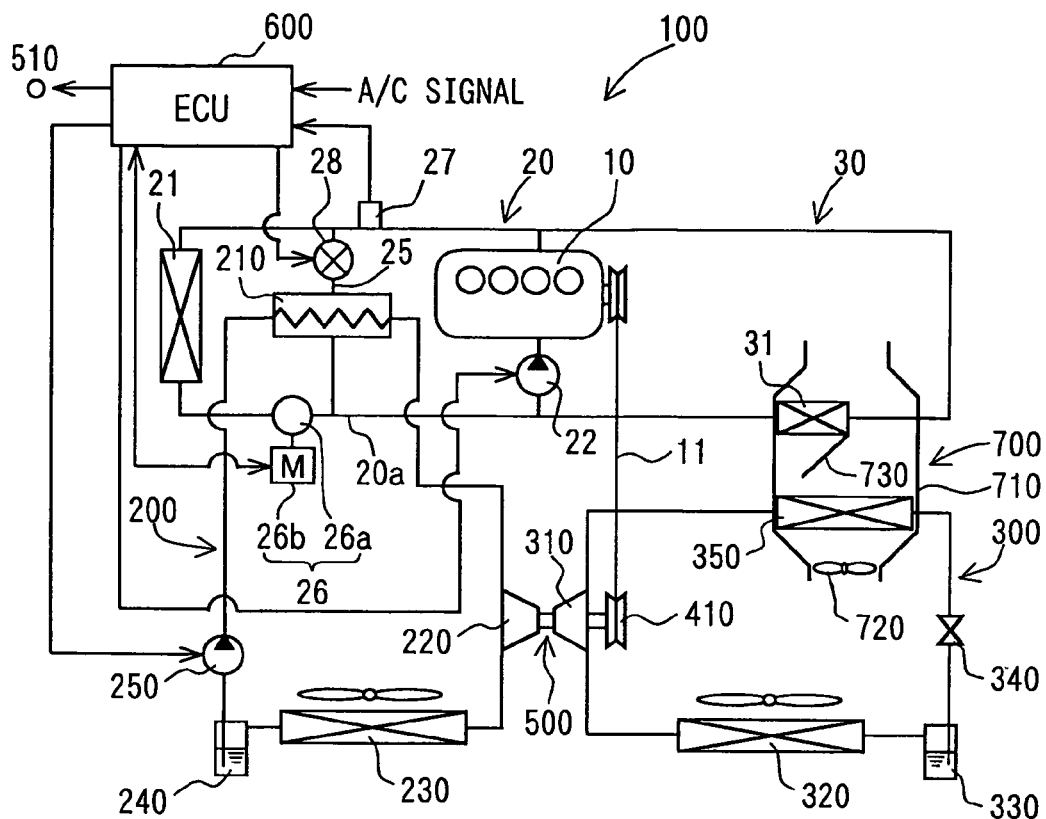
FIG. 11 is a schematic diagram showing an entire structure of a waste heat recovery system for an engine according to a fifth embodiment in the present invention.

As shown in FIG. 11, the electrically driven second switching unit 28 is provided on an inlet side of the heater 210 from which cooling water is introduced. The second switching unit 28 has a switching valve structure which opens and closes a cooling water passage through which cooling water flows into the heater 210. For example, the second switching unit 28 can be an ON-OFF type solenoid valve, which can switch between two positions (i.e., open and close). The second switching valve 28 is controlled by the control unit 600.

Figure 12:
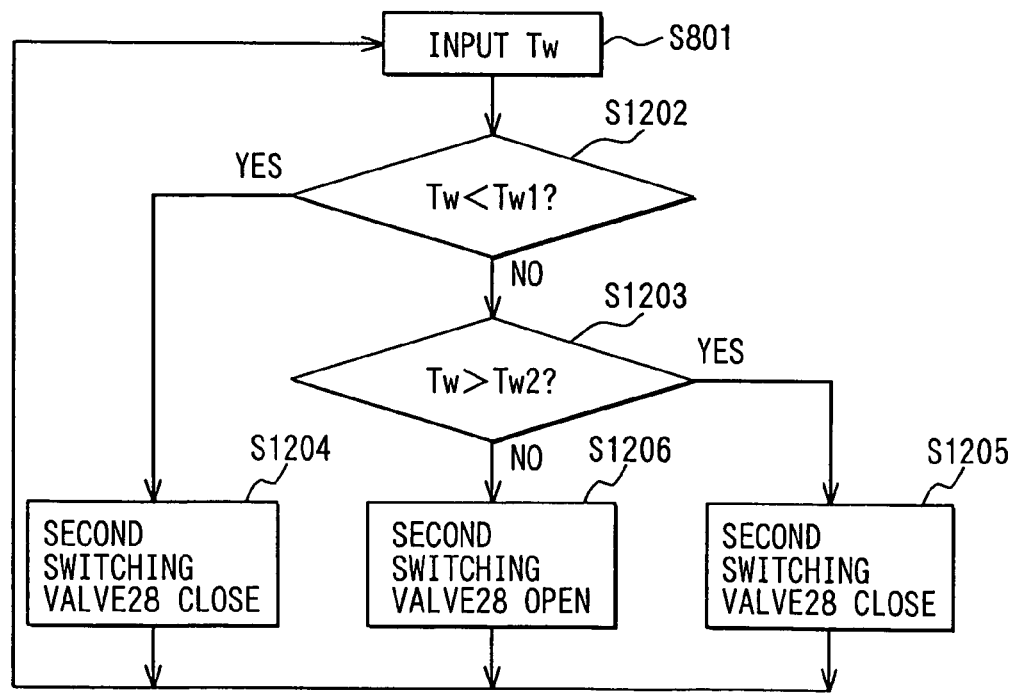
FIG. 12 is a flow diagram showing a control routine which controls an electrically driven second switching unit in FIG. 11.

Next, the control operation (fifth control operation) for controlling the second switching valve 28 is described referring to FIG. 12. The second switching valve 28 opens and closes the flow passage of cooling water (hot water) passing through the bypass circuit 25 in which the heater 210 and the second switching valve 28 are arranged. The hot water pump 22 and the switching valve 26 are operated based on the control operation (first control operation) shown in FIG. 4, in the fifth embodiment. The target water temperature Tt is 95° C., the first threshold −t is −5° C. and the second threshold +t is +5° C., for example, in the fifth embodiment.

At step S801, the control unit 600 inputs the cooling water temperature detection signal transmitted from the water temperature sensor 27, so as to store the outlet water temperature Tw of the engine 10.

At step S1202, it is determined whether the outlet water temperature Tw stored at step S801 is less than a lower limit water temperature Tw1 (fourth threshold) in a Rankine cycle operation. When the outlet water temperature Tw is less than the fourth threshold Tw1, the control routine proceeds to step S1204. Otherwise, when the outlet water temperature Tw is equal to or greater than the fourth threshold Tw1, the control routine proceeds to step S1203. The fourth threshold Tw1 is the lower limit water temperature (e.g., 85° C. in the fifth embodiment) for permitting an operation of the Rankine cycle 200 by introducing cooling water (hot water) heated in the engine 10 into the heater 210, without affecting a heating performance of the engine 10.

At step S1203, it is determined whether the outlet water temperature Tw stored at step S801 is greater than a forcibly closing water temperature (fifth threshold) Tw2. When the outlet water temperature Tw is greater than the fifth threshold Tw2, the control routine proceeds to step S1205. Otherwise, when the outlet water temperature Tw is equal to or less than the fifth threshold Tw2, the control routine proceeds to step S1206. The fifth threshold Tw2 is an upper limit water temperature (e.g., 110° C. in the fifth embodiment). A cooling performance of the engine 10 is prioritized when the outlet water temperature Tw is greater than the fifth threshold Tw2 (fifth threshold Tw2>fourth threshold Tw1).

At step S1204, the outlet water temperature Tw is determined to be less than the lower limit water temperature Tw1, and the second switching valve 28 is closed. While the engine 10 is in a warming-up mode, the outlet water temperature Tw is less than the lower limit water temperature Tw1. In this case, the cooling water passage is closed, and cooling water (hot water) is prohibited from flowing into the heater 210.

At step S1205, the outlet water temperature Tw is determined to be greater than the upper limit water temperature Tw2. The cooling performance of the engine 10 is prioritized when the outlet water temperature Tw is excessively high, that is, the second switching valve 28 is closed. When a high-load operation is performed, the outlet water temperature Tw may be greater than the upper limit water temperature Tw2 (110° C.). In this case, the cooling performance of the engine 10 is prioritized. In such operating condition, the bypass circuit 25 is closed by the second switching valve 28, so that the flow amount of cooling water introduced into the radiator 21 is increased to prioritize the cooling performance of the engine 10.

At step S1206, the outlet water temperature Tw is determined to be between the lower limit water temperature Tw1 and the upper limit water temperature Tw2. Therefore, the second switching valve 28 is opened, and the control routine returns to step S801. The Rankine cycle operation can be performed when the outlet water temperature Tw is equal to or higher than the lower limit water temperature Tw1.

The control steps S801, S1202, S1203 and S1205 construct a forcibly closing control means, which forcibly controls the electrically driven second switching valve 28 when the outlet water temperature Tw is greater than the predetermined water temperature Tw2.

According to the fifth embodiment, the second switching valve 28 is provided on the inlet side of the heater 210, for opening and closing the flow passage of cooling water passing through the heater 210. While the outlet water temperature Tw is less than the lower limit water temperature Tw1 in the warming-up mode, the second switching valve 28 is closed so that cooling water (hot water) can be prevented from flowing into the heater 210. Though the heat capacity of the entire cooling water circuit 20 is increased by addition of the heater 210, cooling water (hot water) does not flow into the heater 210. Accordingly, the addition of the heater 210 does not affect the warming-up performance of the engine 10.

The second switching valve 28 in the fifth embodiment, has an electrically driven structure. Therefore, the second switching valve 28 is suitable to be applied to a control method which controls the second switching valve 28 in accordance with an operating condition, such as a warming-up operation mode of the engine 10. In the control method, when the outlet water temperature Tw is in the predetermined temperature range, the second switching valve 28 is controlled so as to introduce cooling water (hot water) into the heater 210, for example. Thus, waste heat energy of the cooling water (thermal medium) can be effectively used without affecting cooling performance of the engine 10 and the heating performance of the engine 10. The predetermined temperature range is between the lower limit water temperature Tw1 and the higher limit water temperature Tw2, for example.

The fifth embodiment has the forcibly closing control means constructed with the control steps S801, S1202, S1203 and S1205. When the operation is in a high-load operating condition or the like, the outlet water temperature Tw becomes greater than the upper limit water temperature Tw2 (110° C.), at which the cooling performance of the engine 10 is prioritized. In this situation, the flow passage of cooling water through which cooling water is introduced into the heater 210 for supplying waste heat energy to the side of the Rankin cycle circuit 200, is closed to prioritize the cooling performance. In this case, the bypass circuit 25 is closed so as to increase the flow amount of the cooling water introduced into the radiator 21. Therefore, the cooling performance of the engine 10 can be prioritized.

Sixth Embodiment

Figure 13:
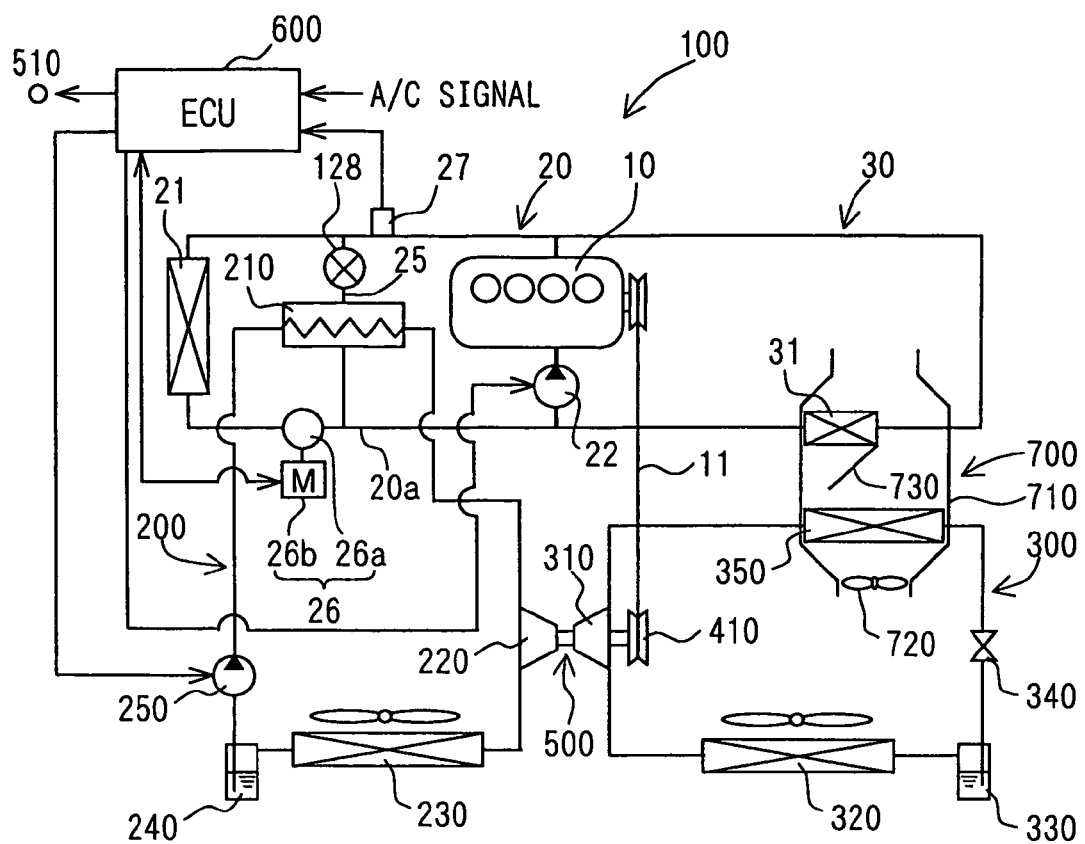
FIG. 13 is a schematic diagram showing an entire structure of a waste heat recovery system for an engine according to a sixth embodiment in the present invention.

The sixth embodiment of the present invention will be now described with reference to FIG. 13. As shown in FIG. 13, a second switching valve 128 employing a generally known thermostat is used in the sixth embodiment, instead of the electrically driven second switching valve 28 described in the fifth embodiment.

The second switching valve 128 is provided on the inlet side of the heater 210, through which cooling water is introduced. When the outlet water temperature Tw is greater than the lower limit water temperature Tw1 (e.g., 85° C. in the sixth embodiment), the thermostat opens a valve member in the switching valve 128, so that cooling water flows through the heater 210. Therefore, in the structure of the sixth embodiment, the waste heat energy of the thermal medium can be effectively used, without affecting the cooling performance of the engine 10 and the heating performance of the engine 10.

In this case, when the cooling performance is sufficiently secured by the radiator 21 or the like, a production cost can be reduced, compared with an electrically driven switching valve using a solenoid for example. Besides, a power source, such as a battery, is not needed when the second switching valve 128 is energized (opened or closed), so that an electrically power consumption can be reduced.

In the fifth embodiment and the sixth embodiment, the heater 210 is arranged in the bypass circuit 25 of the cooling water circuit 20. The second switching unit 28, 128 can be preferably applied to a structure in which the heater 210 is provided in the heater circuit 30, to open and close the flow passage of the cooling water to be introduced into the heater 210.

In the fifth embodiment and the sixth embodiment, when cooling water flows through the heater 210, the radiator flow amount distribution decreases. Further, the heater 210 and the radiator 21 are arranged in parallel with respect to the cooling water flow. However, only in a case where the outlet water temperature Tw is equal to or greater than the lower limit water temperature Tw1, cooling water circulating in the cooling water circuit 20 partially flows through the heater 210. Accordingly, the cooling performance of the engine 10 can be prevented from being affected by decrease of the radiator flow amount distribution.

Because the cooling performance of the engine 10 can be secured, the discharge capacity of the hot water pump 22 does not need to be increased for circulating cooling water through the cooling water circuit 20, even when a cooling capacity of the radiator 21 is limited. Engine power and a fuel consumption efficiency can be prevented from declining due to increase of an engine power consumption which is caused by upsizing the hot water pump 22.

The Rankine cycle 200 and the refrigerant cycle 300 are independently provided, so that the expansion device 220 can be operated regardless of an operation of the refrigerant cycle 300. As a result, waste heat of the engine 10 is recovered by the heater 210 using cooling water as a heat source. Driving power is generated in the expansion device 220 so as to reduce the driving power for rotating the driving devices which drives such as the compressor 310 in the refrigerant cycle 300. Here, the driving devices include the one-way clutch 520, the one-way clutch 530, the solenoid clutch 510 and the pulley 410.

Seventh Embodiment

Figure 14:
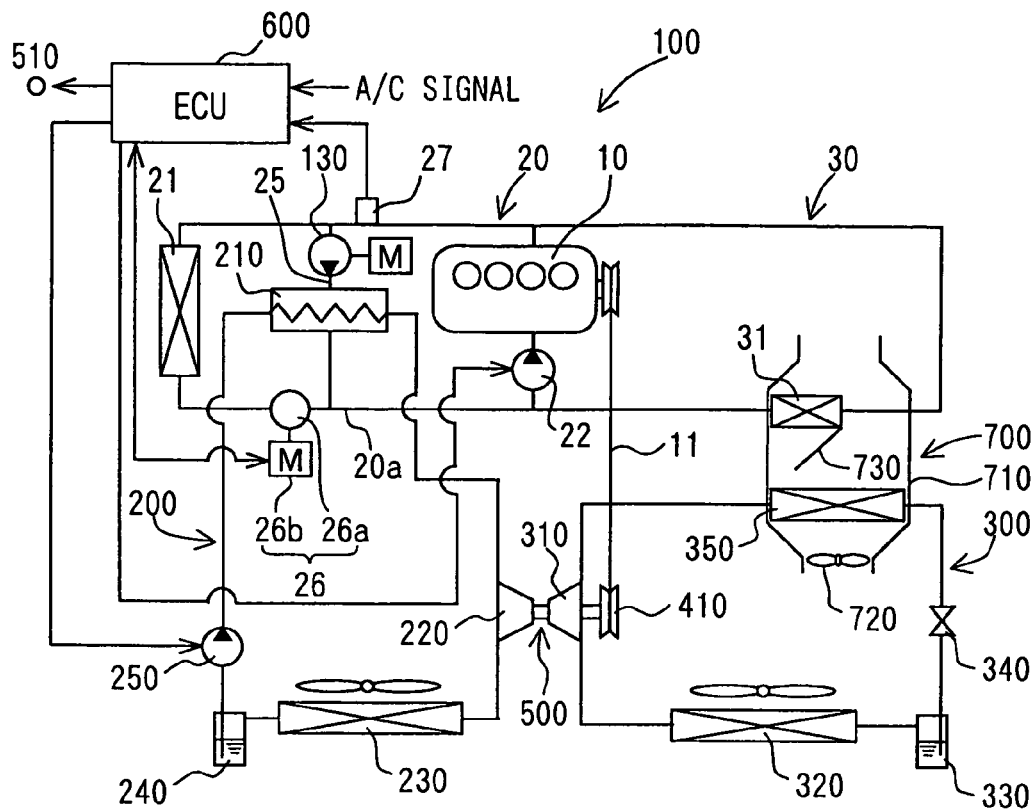
FIG. 14 is a schematic diagram showing an entire structure of a waste heat recovery system for an engine according to a seventh embodiment in the present invention.
Figure 15:
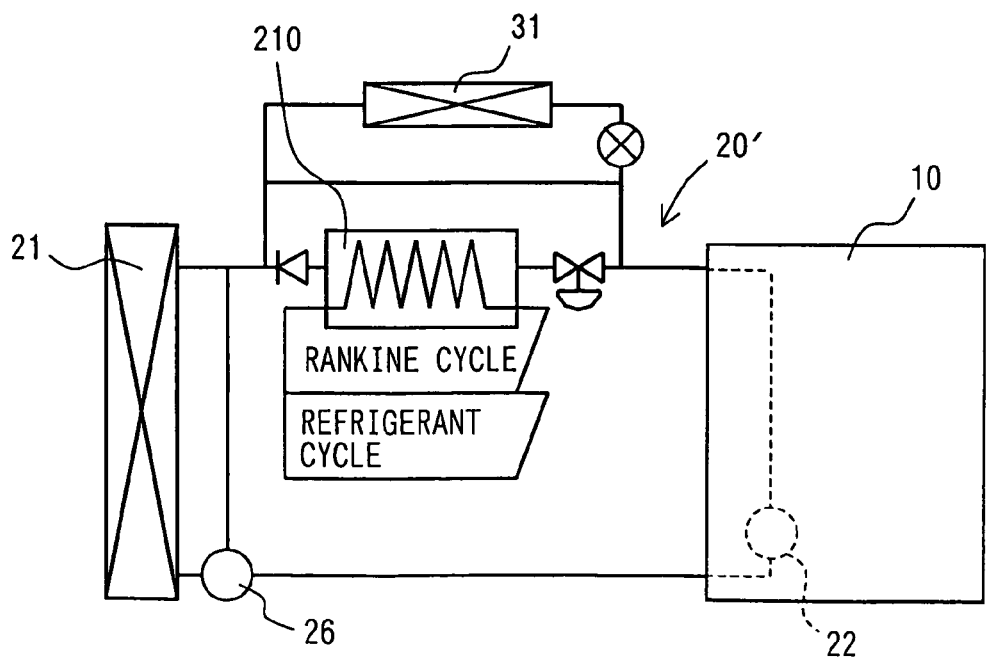
FIG. 15 is a schematic diagram showing an entire structure of a waste heat recovery system for an engine according to a related art.

The seventh embodiment of the present invention will be now described with reference to FIG. 14. As shown in FIG. 14, a second pump (second pumping unit) 130, which employs a rotating device such as a variable-speed electric motor, is used in the seventh embodiment. The electric motor of the second pump 130 is variable in rotating speed, so that the second pump 130 having fixed displacement can be operated as a variable capacity pump. The second pump 130 is provided in a series manner with the heater 210. The second pump 130 is provided on the inlet side of the heater 210, through which cooling water is introduced into the heater 210.

The hot water pump (first pumping unit) 22, which is provided in series with the engine 10, is a mechanical pump in this embodiment. That is, discharging capacity of the mechanical pump is varied substantially in proportion to a rotation speed (revolution) of the engine 10. Therefore, the discharge amount of the mechanical type pump is in proportion with respect to a rotation speed of the engine 10 which is affected by a vehicle running condition.

When the vehicle is driven at a low speed, a rotation speed of the engine 10 is normally kept in low. In this condition, a rotation speed of the hot water pump 22 becomes low, and the hot water pump 22 may not be capable of supplying sufficient hot water into the heater 210. Accordingly, waste heat cannot be sufficiently transmitted to the Rankine cycle 200, and the expansion device 220 cannot produce predetermined output power.

However, in this embodiment, the second pump 130, which may be operated variable in capacity, is provided in the cooling water circuit 20 to circulate hot water into the heater 210. Besides, the rotation speed of the second pump 130 may be controlled individually from a rotation speed of the engine 10. Therefore, waste heat can be stably recovered in the Rankine cycle 200, and the expansion device 220 can produce predetermined power, regardless of the running condition of the vehicle.

For example, the second pump 130 is operated in order to supply at least a predetermined amount of water to the heater 210 regardless of the rotating speed of the engine 10. The second pump 130 may be operated in a manner that the rotating speed of the second pump 130 is increased as the rotating speed of the engine 10 is decreased, so that the second pump 130 maintains an amount of hot water flowing through the heater 210.

The switching valve 26 is provided in the junction located between the cooling water circuit section 20a located on the downstream side of the radiator 21 and the bypass circuit 25. Therefore, cooling water can be more effectively distributed between the radiator 21 and the heater 210. When a rotation speed of the engine 10 is low, and a rotation speed of the hot water pump 22 is low, the switching valve 26 may be closed, and a rotation speed of the second pump 130 may be increased. In this situation, waste heat can be sufficiently transmitted from the cooling water circuit 20 to the Rankine cycle 200, so that waste heat can be more efficiently recovered in the Rankine cycle 200.

Although the present invention has been fully described in connection with the preferred embodiments thereof with reference to the accompanying drawings, it is to be noted that various changes and modifications will become apparent to those skilled in the art.

For example, in the above-described first to seventh embodiments, the engine 10 is used as a heat source of waste heat (heat generating element). However, the heat source can be any heat generating elements from which waste energy can be recovered. The heat generating elements can be a heat engine such as an internal combustion engine, a heat generating element such as a motor or an inverter, a fuel cell such as a FC stack, and the like.

The heat recovery system in the present invention is preferably applied to a hybrid vehicle employing a rotating device such as a motor. The heat recovery system in the present invention is preferably applied to a fuel cell powered vehicle employing a refrigerant cycle including a fuel cell such as a FC stack. The FC stack disposed in the fuel cell powered vehicle generates heat, when electricity is generated by performing chemical reaction between hydrogen and oxygen. The refrigerant cycle includes a thermal medium circulation circuit, so as to cool the FC stack. Thermal medium such as refrigerant or cooling water is circulated in the thermal medium circulation circuit. A driving source for driving a vehicle can be switched between a motor disposed in the hybrid vehicle and an internal combustion engine, in accordance with a driving condition of the hybrid vehicle. The motor is used as a generator when the vehicle is driven using the internal combustion engine as the driving source. The heat recovery system in the present invention includes a thermal medium circulation circuit. When the motor is used, the motor generates heat. Therefore, thermal medium such as cooling water is circulated so as to cool the motor in the thermal medium circulation circuit.

In the above-described first to seventh embodiments, the operation fluid is used in the Rankine cycle, and the refrigerant is used in the refrigerant cycle. However, in the Rankine cycle, the same refrigerant as in the refrigerant cycle can be used as the operation fluid.

Such changes and modifications are to be understood as being within the scope of the present invention as defined by the appended claims.

What is claimed is:

1. A waste heat recovery system of a heat source that is cooled by a circulation of a thermal medium, the system comprising:
   a cooling heat exchanger for cooling the thermal medium, disposed in a thermal medium circulating circuit through which the thermal medium is circulated between the cooling heat exchanger and the heat source; and
   a Rankine cycle including
      a heater that performs heat exchange between an operation fluid and the thermal medium heated by the heat source so as to heat the operation fluid, and
      an expansion device that expands the operation fluid, which is heated by the heater to be evaporated, so as to generate a driving power,
   wherein the heater is arranged in parallel with the cooling heat exchanger in such a manner that the thermal medium flowing through the heater bypasses the cooling heat exchanger,
   the system further comprising:
   a temperature sensor for sensing an actual temperature of the thermal medium;
   a first pumping unit disposed in the thermal medium circulating circuit to circulate the thermal medium; and
   a first switching unit disposed in the thermal medium circulating circuit to adjust a flow distribution between a flow amount of thermal medium to be introduced into the heater and a flow amount of thermal medium passing through the cooling heat exchanger, at least one of a discharge capacity of the first pumping unit and the flow distribution distributed by the first switching unit being variable;
   a control unit for controlling at least one of the first pumping unit and the first switching unit based on a temperature of thermal medium discharged from the heat source in the thermal medium circulating circuit, wherein
   the control unit includes means for calculating a difference between a target thermal medium temperature and the actual temperature of the thermal medium discharged from the heat source;
   when the difference is less than a first threshold, the control unit determines that a temperature of the heat source is excessively low, and controls the first switching unit so as to decrease a distribution amount of thermal medium flowing into the cooling heat exchanger when the distribution amount is not substantially zero; and
   when the difference is greater than a second threshold, which is higher than the first threshold, the control unit determines that the temperature of the heat source is excessively high, and controls the first pumping unit so as to increase the discharge capacity when the first pumping unit has an extra discharge capacity.

2. The waste heat recovery system of the heat source according to claim 1, further comprising:
   a bypass circuit that is branched from a section of the thermal medium circulating circuit where thermal medium is circulated between the heat source and the cooling heat exchanger to bypass the cooling heat exchanger, and merged with a downstream side of the cooling heat exchanger in the thermal medium circulating circuit, wherein the heater is arranged in the bypass circuit.

3. The waste heat recovery system of the heat source according to claim 1, further comprising:
   a heater circuit that includes a heating heat exchanger which performs heat exchange between blown air and thermal medium heated by the heat source so as to heat the blown air, wherein the heater is arranged in the heater circuit.

4. The waste heat recovery system of the heat source according to claim 1, wherein:
   the heater circuit further includes a second pumping unit for circulating the thermal medium; and
   the second pumping unit has a variable discharge capacity.

5. The waste heat recovery system of the heat source according to claim 4, wherein:
   the heat source is a rotating device; and
   the second pumping unit is controlled based on a rotation speed of the rotating device.

6. The waste heat recovery system of the heat source according to claim 1, further comprising:
   a second switching unit for opening and closing a flow passage of thermal medium flowing into the heater, wherein the second switching unit is located on one of an inlet side of the heater and an outlet side of the heater.

7. The waste heat recovery system of the heat source according to claim 6, wherein the second switching unit is provided to change a flow amount of thermal medium flowing into the heater.

8. The waste heat recovery system of the heat source according to claim 7, further comprising: means for forcibly closing the second switching unit when a temperature of the thermal medium is equal to or greater than a predetermined temperature.

9. The waste heat recovery system of the heat source according to claim 1, further comprising:
   a driving device that is disposed to obtain a driving power generated in the heat source; and a refrigerant cycle that includes a compressor driven by the driving device for compressing and circulating refrigerant, wherein:
the expansion device is mechanically coupled with the compressor; and
the expansion device is disposed to add the driving power generated in the expansion device to the compressor, when the driving power is generated in the expansion device.

10. The waste heat recovery system of the heat source according to claim 1, further comprising:
a second pumping unit disposed in the thermal medium circulating circuit to circulate the thermal medium into the heater in an auxiliary manner,
wherein the second pumping unit has a variable discharge capacity.

11. The waste heat recovery system of the heat source according to claim 10, wherein:
the heat source is a rotating device; and
the first pumping unit is controlled based on a rotation speed of the rotating device.

12. The waste heat recovery system of the heat source according to claim 10,
wherein at least one of a discharge capacity of the second pumping unit and the flow distribution distributed by the first switching unit is variable.

13. A waste heat recovery system of a heat source that is cooled by a circulation of a thermal medium, the system comprising:
a cooling heat exchanger for cooling the thermal medium, disposed in a thermal medium circulating circuit through which the thermal medium is circulated between the cooling heat exchanger and the heat source; and
a Rankine cycle including
a heater that performs heat exchange between an operation fluid and the thermal medium heated by the heat source so as to heat the operation fluid, and
an expansion device that expands the operation fluid, which is heated by the heater to be evaporated, so as to generate a driving power;
a first pumping unit disposed in the thermal medium circulating circuit to circulate the thermal medium; and
a second pumping unit disposed in the thermal medium circulating circuit to circulate the thermal medium into the heater in an auxiliary manner; and
wherein:
the heater is arranged in parallel with the cooling heat exchanger in such a manner that the thermal medium flowing through the heater bypasses the cooling heat exchanger; and
the second pumping unit has a variable discharge capacity,
wherein the heat source is an internal combustion engine,
the first pump has a variable discharge capacity, which is substantially in proportion to a rotation speed of the internal combustion engine, and
when the rotation speed is low:
the discharging capacity of the first pump becomes small, and
a discharging capacity of the second pump is controlled to become large.

14. The waste heat recovery system of the heat source according to claim 13, further comprising:
a switching unit disposed in the thermal medium circulating circuit to adjust a flow distribution between a flow amount of thermal medium to be introduced into the heater and a flow amount of thermal medium passing through the cooling heat exchanger,
wherein at least one of a discharge capacity of the second pumping unit and the flow distribution distributed by the switching unit is variable.

15. The waste heat recovery system of the heat source according to claim 13, further comprising:
a control unit,
wherein:
the first pumping unit is mechanically coupled with the internal combustion engine, and
the second pumping unit is electrically controlled based on a driving signal of the control unit.

16. A waste heat recovery system of a heat source that is cooled by a circulation of a thermal medium, the system comprising:
a cooling heat exchanger for cooling the thermal medium, disposed in a thermal medium circulating circuit through which the thermal medium is circulated between the cooling heat exchanger and the heat source;
a pumping unit disposed in the thermal medium circulating circuit to circulate the thermal medium; and
a temperature sensor for sensing an actual temperature of the thermal medium;
a Rankine cycle including
a heater that performs heat exchange between an operation fluid and the thermal medium heated by the heat source so as to heat the operation fluid, and
an expansion device that expands the operation fluid, which is heated by the heater to be evaporated, so as to generate a driving power;
a switching unit disposed in the thermal medium circulating circuit to adjust a flow distribution between a flow amount of thermal medium to be introduced into the heater and a flow amount of thermal medium passing through the cooling heat exchanger;
a control unit for controlling the pumping unit based on a temperature of thermal medium discharged from the heat source in the thermal medium circulating circuit,
wherein at least one of a discharge capacity of the pumping unit and the flow distribution distributed by the switching unit being variable, and
the heater is arranged in parallel with the cooling heat exchanger in such a manner that the thermal medium flowing through the heater bypasses the cooling heat exchanger,
the control unit includes means for calculating a difference between a target thermal medium temperature and the actual temperature of thermal medium discharged from the heat source;
when the difference is less than a first threshold, the control unit determines that a temperature of the heat source is excessively low, and controls the pumping unit so as to decrease the discharge capacity of the pumping unit; and
when the difference is greater than a second threshold that is larger than the first threshold, the control unit determines that the temperature of the heat source is excessively high, and controls the pumping unit so as to increase the discharge capacity.

17. The waste heat recovery system of the heat source according to claim 16, further comprising:
a cooling water temperature detecting unit that is disposed on a downstream side of the heat source and disposed on an upstream side of both the cooling heat exchanger and the heater for detecting temperature of thermal medium, which is discharged from the heat source.

18. The waste heat recovery system of the heat source according to claim 16, wherein:
the switching unit is a switching valve including a thermostat, which responds to temperature of thermal medium flowing through the thermal medium circulating circuit, and
the switching valve adjusts a flow distribution of thermal medium, which is to be introduced into the cooling heat exchanger, in response to the thermostat.

19. The waste heat recovery system of the heat source according to claim 16, further comprising:
a bypass circuit that is branched from the thermal medium circulating circuit to bypass the cooling heat exchanger and merged with the thermal medium circulating circuit at a merge section,
wherein the switching unit is disposed on a downstream side of the cooling heat exchanger and disposed on an upstream side of the merge section.

20. The waste heat recovery system of the heat source according to claim 16, wherein:
the second threshold is greater than the first threshold.

21. The waste heat recovery system of the heat source according to claim 16, further comprising:
a bypass circuit, which is branched from the thermal medium circulating circuit at a branch section to bypass the cooling heat exchanger and merged with the thermal medium circulating circuit at a merge section, wherein:
the pumping unit is disposed on an upstream side of the branch section and disposed on a downstream side of the merge section.

22. The waste heat recovery system of the heat source according to claim 18, wherein:
the switching valve adjusts a flow distribution of thermal medium in such a manner that a distribution amount of thermal medium distributed to the heater is prioritized compared with a distribution amount of thermal medium distributed to the cooling heat exchanger so as not to distribute thermal medium for increasing and decreasing the thermal medium distributed to the cooling heat exchanger.

23. A waste heat recovery system of a heat source that is cooled by a circulation of a thermal medium, the system comprising:
a cooling heat exchanger for cooling the thermal medium, disposed in a thermal medium circulating circuit through which the thermal medium is circulated between the cooling heat exchanger and the heat source; and
a pumping unit disposed in the thermal medium circulating circuit to circulate the thermal medium;
a Rankine cycle including
a temperature sensor for sensing an actual temperature of the thermal medium;
a heater that performs heat exchange between an operation fluid and the thermal medium heated by the heat source so as to heat the operation fluid, and
an expansion device that expands the operation fluid, which is heated by the heater to be evaporated, so as to generate a driving power;
a switching unit disposed in the thermal medium circulating circuit to adjust a flow distribution between a flow amount of thermal medium to be introduced into the heater and a flow amount of thermal medium passing through the cooling heat exchanger;
a control unit for controlling the switching unit based on a temperature of thermal medium discharged from the heat source in the thermal medium circulating circuit,
wherein at least one of a discharge capacity of the pumping unit and the flow distribution distributed by the switching unit being variable, and
the heater is arranged in parallel with the cooling heat exchanger in such a manner that the thermal medium flowing through the heater bypasses the cooling heat exchanger,
the control unit includes means for calculating a difference between a target thermal medium temperature and an actual temperature of the thermal medium discharged from the heat source;
when the difference is less than a first threshold, the control unit determines that a temperature of the heat source is excessively low, and controls the switching unit so as to decrease a distribution amount of thermal medium distributed by the switching unit to the cooling heat exchanger; and
when the difference is greater than a second threshold, which is higher than the first threshold, the control unit determines temperature of the heat source is excessively high, and controls the switching unit so as to increase the distribution amount.

24. The waste heat recovery system of the heat source according to claim 23, further comprising:
a cooling water temperature detecting unit that is disposed on a downstream side of the heat source and disposed on an upstream side of both the cooling heat exchanger and the heater for detecting temperature of thermal medium, which is discharged from the heat source.

25. The waste heat recovery system of the heat source according to claim 23, wherein:
the pumping unit is a mechanical pump that is operated, without being controlled by the control unit based on the temperature detected using the cooling water temperature detecting unit.

26. The waste heat recovery system of the heat source according to claim 23, wherein:
the second threshold is greater than the first threshold.

27. The waste heat recovery system of the heat source according to claim 23, wherein:
when the difference is greater than the second threshold, the control unit controls the switching unit so as to increase the distribution amount of thermal medium distributed to the cooling heat exchanger, and the control unit controls the switching unit so as to decrease a distribution amount of thermal medium distributed to the heater.

28. The waste heat recovery system of the heat source according to claim 23, wherein:
when the difference is less than the first threshold, the control unit controls the switching unit so as to decrease the distribution amount of thermal medium distributed to the cooling heat exchanger, and the control unit controls the switching unit so as to increase a distribution amount of thermal medium distributed to the heater.

* * * * *